(12) United States Patent
Bachmann et al.

(10) Patent No.: US 8,971,270 B2
(45) Date of Patent: Mar. 3, 2015

(54) GROUP-BASED PAGING FOR MACHINE-TYPE-COMMUNICATION (MTC) DEVICES

(75) Inventors: Jens Bachmann, Langen (DE); Genadi Velev, Langen (DE); Shinkichi Ikeda, Kanagawa (JP); Takahisa Aoyama, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 112 days.

(21) Appl. No.: 13/634,615

(22) PCT Filed: Jan. 25, 2011

(86) PCT No.: PCT/EP2011/000311
§ 371 (c)(1),
(2), (4) Date: Oct. 23, 2012

(87) PCT Pub. No.: WO2011/116849
PCT Pub. Date: Sep. 29, 2011

(65) Prior Publication Data
US 2013/0136072 A1 May 30, 2013

(30) Foreign Application Priority Data

Mar. 26, 2010 (EP) .................................... 10003263
Jun. 24, 2010 (EP) .................................... 10006600

(51) Int. Cl.
*H04W 4/00* (2009.01)
*H04W 72/00* (2009.01)
(Continued)

(52) U.S. Cl.
CPC ................ *H04W 68/02* (2013.01); *H04W 4/00* (2013.01); *H04W 4/005* (2013.01); *H04W 68/00* (2013.01); *H04W 4/08* (2013.01)
USPC .......................................... 370/329; 455/450

(58) Field of Classification Search
CPC . H04W 68/11; H04W 52/0216; H04W 80/04; H04W 24/00; H04W 48/08
USPC .......................................... 455/503, 519, 518
See application file for complete search history.

(56) References Cited

U.S. PATENT DOCUMENTS

2007/0076682 A1  4/2007 Kim et al.
2008/0182596 A1*  7/2008 Wang et al. ................... 455/458
(Continued)

OTHER PUBLICATIONS

ETSI: "ETSI TS 136 300 V9.2.0(Feb. 2010)—LTE; Evolved Universal Terrestrial Radio Access (E-UTRA) and Evolved Universal Terrestrial Radio Access Network (E-UTRAN); Overall Description; Stage 2 (3GPP TS 36.300 version 9.2.0 Release 9)".
ETSI: "3GPP TR 23.888V0.3.2(Mar. 2010)—3rd Generation Partnership Project; Technical Specification Group Services and System Aspects; System Improvements for Machine-Type Communications; (Release 10)" Internet/ETSI. Mar. 22, 2010, XP002589912 Retrieved from the Internet: http://www.3gpp.org/ftp/Specs/html-info/23888.htm (retrieved on Jun. 28, 2010).

(Continued)

*Primary Examiner* — Edan Orgad
*Assistant Examiner* — Rebecca Song
(74) *Attorney, Agent, or Firm* — Pearne & Gordon LLP

(57) ABSTRACT

The invention relates to a method for paging a group of MTC devices, and for transmitting parameter information to the MTC devices using the paging mechanism. MTC devices are grouped together and a different group ID per group to which the MTC device belongs is assigned to the MTC device. A specific group paging resource indication is determined for each group wherein each MTC device is assigned one of the group paging resource indications. The network pages MTC devices of a group by transmitting a paging message at the corresponding channel resources and including the corresponding group ID. Additionally, the group paging resource indications of several groups of MTC devices can be aligned in such a way with the transmissions and re-transmissions by the network, that the different groups respectively receive the transmission and re-transmissions of the paging message.

9 Claims, 10 Drawing Sheets

(51) Int. Cl.
*H04W 68/02* (2009.01)
*H04W 68/00* (2009.01)
*H04W 4/08* (2009.01)

(56) References Cited

U.S. PATENT DOCUMENTS

| | | | |
|---|---|---|---|
| 2010/0022257 A1* | 1/2010 | Koskela | 455/458 |
| 2010/0035633 A1* | 2/2010 | Park et al. | 455/456.1 |
| 2010/0190514 A1* | 7/2010 | Laroia et al. | 455/458 |
| 2010/0273511 A1* | 10/2010 | Chen et al. | 455/458 |
| 2010/0279715 A1* | 11/2010 | Alanara et al. | 455/458 |
| 2011/0274040 A1* | 11/2011 | Pani et al. | 370/328 |
| 2012/0004003 A1* | 1/2012 | Shaheen et al. | 455/509 |
| 2012/0040700 A1* | 2/2012 | Gomes et al. | 455/500 |
| 2014/0198665 A1* | 7/2014 | Cai | 370/241 |
| 2014/0206370 A1* | 7/2014 | Worrall | 455/450 |

OTHER PUBLICATIONS

ETSI: "3GPP TS 22.368 V1.2.2 (Feb. 2010)—3rd Generation Partnership Project; Technical Specification Group Services and System Aspects; Service requirements for machine-type communications; Stage 1(Release 10)" Internet/ETSI. Mar. 23, 2010, XP002589913 Retrieved from the Internet: http://www.3gpp.org/ftp/Specs/html-info/22368.htm (retrieved on Jun. 28, 2010).

ETSI: "3GPP TR 22.868 V8.0.0 (Mar. 2007)—3rd Generation Partnership Project; Technical Specification Group Services and System Aspects; Study on Facilitating Machine to Machine Communication in 3GPP Systems; (Release 8)" Internet ETSI. Mar. 26, 2007, XP002589914 Retrieved from the Internet: http://www.3gpp.org/ftp/Specs/html-info/22868.htm (retrieved on Jun. 28, 2010).

European Search Report for Application 10003263.0-2416 dated Jul. 21, 2010.

* cited by examiner

| pseudo IMSI | MCC | MNC | MSIN |
|---|---|---|---|
| | 3 digits | 2-3 digits | 9-10 digits |

MTC Device (group) specific encoded parameters + group ID

| pseudo IMSI | group ID | parameter |
|---|---|---|
| | x digits | 15-x digits |

| pseudo S-TMSI | group ID | parameter |
|---|---|---|
| | x digits | 10-x digits |

GROUP-BASED PAGING FOR MACHINE-TYPE-COMMUNICATION (MTC) DEVICES

FIELD OF THE INVENTION

The invention relates to a method for paging a group of devices using a group paging target identity and a separate group paging resource indication. Furthermore, the invention relates to a device, such as an MTC device, and a network entity that participate in the invention.

TECHNICAL BACKGROUND

UMTS (Universal Mobile Telecommunications System) is the 3G (3rd Generation) mobile communication system standardised by 3GPP (3rd Generation Partnership Project).

LTE—Long Term Evolution

In order to be prepared for further increasing user demands and to be competitive against new radio access technologies the 3GPP launched a study item "Evolved UTRA and UTRAN" better known as "Long Term Evolution (LTE)". The study investigated means of achieving major leaps in performance in order to improve service provisioning and to reduce user and operator costs. Out of that and because interworking with other radio access technologies should be possible, the need arose for a new evolved Packet Core Network.

An exemplary representation of the evolved system architecture is given in FIG. 1. The E-UTRAN consists of evolved Node Bs (eNB or eNodeB), providing the E-UTRA user plane (PDCP/RLC/MAC/PHY) and control plane (RRC) protocol terminations towards the mobile node (also denoted UE or MN).

The eNB hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. Further, it performs many functions including radio resource management, admission control, scheduling, enforcement of negotiated UL-QoS (Quality of Service), cell information broadcast, ciphering/deciphering of user and control plane data, and compression/decompression of DL/UL user plane packet headers. The eNBs are also connected by means of the S1 interface to the EPC (Evolved Packet Core), more specifically to the MME (Mobility Management Entity) by means of the S1-MME, and to the Serving Gateway (S-GW) by means of the S1-U.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway). For idle state UEs, the S-GW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and the paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the Home Subscriber Server, HSS). It checks the authorization of the UE to camp on the service provider's Public Land Mobile Network (PLMN) and enforces UE roaming restrictions. The MME is the termination point in the network for ciphering/integrity protection for NAS signaling and handles the security key management. The MME also provides the control plane function for mobility between LTE and 2G/3G access networks with the S3 interface terminating at the MME from the SGSN (Serving GPRS Support Node). The MME also terminates the S6a interface towards the home HSS for roaming UEs.

The Packet Data Network Gateway (PDN-GW) provides connectivity for the UE to external packet data networks by being the point of exit and entry of traffic for the UE. A UE may have simultaneous connectivity with more than one PDN-GW for accessing multiple PDNs. The PDN-GW performs policy enforcement, packet filtering for each user, charging support, lawful interception and packet screening. Another key role of the PDN-GW is to act as the anchor for mobility between 3GPP and non-3GPP technologies.

To summarize the above, in order to support the new E-UTRAN access, the new 3GPP Core Network is mainly separated into three logical entities. At first, in the user plane the PDN-GW is the gateway to the external networks and the global mobility anchor for mobility between 3GPP and non-3GPP access technologies (like CDMA2000, WiMAX or WiFi). Second, another user plane entity, the Serving Gateway, is the mobility anchor for mobility between 3GPP accesses (E-UTRAN, UTRAN, GERAN). Third, a Mobility Management Entity is the control plane entity responsible for the mobility management of mobile terminals (also referred to in the following as UEs or MNs) moving between different EUTRAN base stations (eNodeBs) and also responsible for the session management.

As described above, the MME is responsible for mobility management and session management. For each mobile terminal attached to an MME, specific mobility management and evolved packet system context information is stored in the MME. These contexts comprise e.g. the mobility state, the temporary identity, the current Tracking Area List, last known cell, authentication vectors, access restrictions, subscribed QoS profile, subscribed charging characteristics and for each active PDN connection the APN (Access Point Name) in use, IPv4/IPv6 addresses, PDN-GW address for control plane and also information for each EPS (Evolved Packet System) bearer within the PDN connection, as for example EPS bearer QoS profile, EPS bearer charging characteristics.

The mobility management within the 3GPP system is network controlled, and two protocol variants are standardised for the interface between the PDN-GW and the S-GW. One is based on GTP (GPRS Tunneling Protocol), the protocol used in the legacy GPRS (General Packet Radio Service) system, and the other one is Proxy Mobile IPv6 (PMIPv6), developed in the IETF (Internet Engineering Task Force). For interworking with non-3GPP accesses, the mobile terminal can be connected to the Core Network, i.e. the PDN-GW, via PMIPv6 as well, in case the non-3GPP access supports PMIPv6. Alternatively, if the mobile terminal does not support inter-access handover with PMIPv6 or if the non-3GPP access does not support PMIPv6, the mobile terminal can be connected to the Core Network via Client Mobile IP versions, i.e. Mobile IPv4 Foreign Agent Mode (MIP4FA) or Dual Stack Mobile IPv6 (DSMIPv6).

Machine to Machine

The current mobile networks are optimally designed for Human-to-Human communications, but are less optimal for M2M (Machine-2-Machine) applications, which according to 3GPP is also termed MTC (Machine-Type-Communication).

M2M Communication can be seen as a form of data communication between entities that do not necessarily need human interaction. It is different to current communication models as it involves:
- new or different market scenarios
- lower costs and effort
- a potentially very large number of communicating terminals
- to a large extent little traffic per terminal Some MTC applications are for example:
- Security (e.g. Alarm Systems, Backup for landline, Access Control, Car/Driver security)
- Tracking & Tracing (e.g. Fleet Management, Order Management, Pay as you drive, Road Tolling, Traffic information)
- Payment (Point of Sales, Vending machines, Loyalty Concepts, Gaming machines)
- Health (Monitoring vital signs, Remote diagnostics, Web Access Telemedicine point)
- Remote Maintenance/Control (Sensors, Lighting, Pumps, Valves, Elevator control)
- Metering (e.g. Power, Gas, Water, Heating, Grid Control)

A study item on M2M communications (3GPP TR 22.868) was completed in 2007; however, no subsequent normative specification has been published. For Rel-10 and beyond, 3GPP intends to take the results on network improvements from the study item forward into a specification phase and address the architectural impacts and security aspects to support MTC scenarios and applications. As such, 3GPP has defined a work item on Network Improvements for Machine-Type Communication (NIMTC). The following goals and objectives are described in the work item:
- Provide network operators with lower operational costs when offering machine-type communication services
- Reduce the impact and effort of handling large machine-type communication groups
- Optimize network operations to minimize impact on device battery power usage
- Stimulate new machine-type communication applications by enabling operators to offer services tailored to machine-type communication requirements Depending on the kind of application, a very large number of MTC devices can be deployed in some areas, e.g. smart meters in an urban area. In this case it may happen that all the MTC devices establish a connection to the network at the same time, thus causing a signaling peak and congestion in the network. This may be the case for example if
- there is a malfunctioning in the MTC application and/or MTC Server
- an external event (end of power outage) triggers MTC devices to attach/connect
- recurring applications are synchronized to the exact (half/quarter) hour If the number of connection establishment requests is getting too high, the SGSN/MME can reject some of the connection establishment requests. However, the congestion is only resolved in the Core Network but not in the Radio Access Network. Thus, in case many MTC devices are in the same cell and are causing a signalling peak there is also congestion in the Radio Access. In addition, the Core Network entities may be already overloaded because of a mass of concurrent transmissions/attachments at once. Therefore, the rejection by the SGSN/MME may be too late.

FIG. 2 illustrates the number of MTC devices connecting to the network over time. As can be seen, the peak event triggers the connection establishment of the MTC devices which rapidly leads to a congestion of the system.

In the prior art there are three different kinds of solutions how to reduce or prevent signalling congestion or overload in the network:
- Rejecting connection requests by the SGSN/MME: this solution is based on the rejection of NAS signaling requests (attach request or TAU request or Service Requests) sent from the MTC Devices. The SGSN/MME can decide to reject signaling requests for MTC Devices attached to a particular APN or belonging to a particular MTC Group. Further, to avoid an MTC Device from re-initiating a connection request or attach request immediately after a reject to an earlier request, the SGSN/MME can provide a back-off time to the MTC Device in the reject message. The problems with this approach are:
  - only congestion in the Core Network (SGSN/MME and GGSN/PGW) is resolved, but not in the Radio Access because the MTC devices continue to establish RRC connections in order to send the NAS signalling requests to the SGSN/MME.
  - also mass concurrent transmission/attachments may overload Core Network entities at once, so that rejection may not work and is already too late as well.
- Rejecting connection requests by the RAN: it is proposed that the MTC Devices can send a "low-priority indication" in the RRCConnectionRequest message. The NB/eNB can be configured to reject low priority signalling requests by the MTC Devices, i.e. if the NB/eNB is aware about a congestion situation in the core network (CN) or RAN network. Further, the eNB can inform the MME (via S1-AP) about the low-priority of the UE, so that the SGSN/MME can also decide to reject the NAS signalling request from the MTC Device, if there is a congestion at the Core Network. Additionally, the eNB can provide an extended back-off timer to inform the MTC Devices when they may re-initiate the signalling. The problems with this approach are:
  - The MTC Devices already competed for RACH channel to send RRCConnectionRequest, i.e. the MTC has already used contention-based preambles.
- Baring the access for the MTC Devices including baring information in the SIB2: the access class baring (ACB) functionality has been already specified in previous releases of 3GPP. The ACB can be applied to UEs belonging to a particular access class. This solution extends the granularity for baring to be 1) All MTC Devices, 2) particular MTC Group, 3) per APN, 4) per PLMN. The problems with this approach are:
  - Baring is a slow process (in worst case it can take ~20 sec due to the maximum system information modification period).
  - Baring in the whole PLMN coverage is not desired.

Paging

When a UE is in IDLE state and camps on an eNB cell, the UE is synchronized with the cell in order to be able to read paging information. The paging is a general procedure for seeking the UE within an amount of cells, where the UE stays in IDLE state. When a UE receives a paging message/signal, the UE transfers from IDLE to CONNECTED state and establishes an RRC connection with the eNB where the UE is camped in IDLE mode.

The MME is informed by the UE's P/SGW that packets should be delivered. The MME sends a paging message (PM)

to all eNBs being part of the so called tracking area where the UE can move without the Tracking Area Update (TAU) procedure (except the periodic TAU procedure). The PM from the MME to the eNB contains amongst other the following information:

UE_ID Index Value: known as UE_ID, which is calculated by (IMSI mod 1024). Correspondingly, the UE_ID may have values in the range of [0, 1 . . . 1023].

UE Paging Identity: can be the IMSI (as stored on the SIM card) or the SAE-Temporary Mobile subscriber ID (S-TMSI) assigned to the UE during the attach procedure. The UE paging Identity is transmitted from the eNB to the UE in a paging message (PM) over the radio interface (i.e. Uu interface).

Paging DRX cycle: is the Discontinuous Reception (DRX) cycle configured in the UE (using NAS signalling) or the default DRX cycle broadcast in the System Information Block (SIB). The default DRX cycle is also known as Paging Cycle in the RadioResourceConfigCommon SIB. The UE may use discontinued reception in IDLE mode in order to reduce power consumption. The DRX cycle is a time interval between monitoring Paging Occurrences for a specific UE. The values of the default DRX/paging cycle broadcast in the SIB are 32, 64, 128 or 256 radio frames.

Triggered by the PM from the MME, the eNB then broadcasts another PM over the radio interface in a defined paging occurrence. The calculations of the paging occurrence in the eNB and the UE are aligned so that they send/listen to the paging message in the same paging occurrence. The paging occurrence means in which radio frame (called paging frame, PF) and in which subframe (paging occasion) the paging message is sent. The paging frame number (PF#) is calculated according to the following formula:

$$PF\# \bmod T = (T \text{ div } \min(T, nB)) * (UE\_ID \bmod \min(T, nB))$$

where "T" is the DRX Cycle and "nB" is a SIB parameter.

The paging occasion has values in the range of [0, 1, . . . 9], as in LTE there are 10 subframes within one radio frame. The paging occasion number (also indicated by i_s below) is calculated according to the following formula:

$$i\_s = \text{floor}(UE\_ID/\min(T, nB)) \bmod (\max(1, nB/T)).$$

If the UE is triggered to read the paging message and the paging message contains the UE's identity (UE paging identity is the UE's IMSI), then the UE is informed that data is waiting to be delivered and the UE transfers from IDLE to CONNECTED state, i.e. the UE initiates the RRC connection establishment procedure.

It should be noted that the abbreviation "PO" is used throughout the description, as paging occurrence or paging occasion. A paging occasion refers to the subframe having a number in the range of [0, 1 . . . 9] within a paging frame. Paging occurrence is a general term for the paging frame and the paging occasion, and refers to the location of the resources in the PDCCH (physical downlink control channel) monitored by the UE for paging messages.

A UE is paged by using the IMSI (or S-TMSI) of the UE as paging identity in the paging message send in the PDSCH (physical downlink shared channel). Therefore, for each UE a separate paging message has to be transmitted from the MME to the eNB(s), which has then to be broadcast from the corresponding eNB(s). This is reasonable because the incoming traffic (e.g. voice call or SMS) for the different UEs arrives separately and is not synchronized, so that the network pages the individual UEs separately as well.

However, MTC devices have traffic pattern and applications that are different from the usual UE. Thus, it is a realistic scenario where it would be advantageous that the network may want to trigger a group of MTC devices simultaneously. In a scenario in which a large number of MTC devices is deployed and is to be paged at generally the same time, this would cause a great amount of traffic because of the numerous paging messages transmitted in the core network and over the radio interface. Aggravating is the fact that each paging message transmitted over the radio interface by the eNB is retransmitted a couple of times, e.g. 3 times, thus generating even more traffic and wasting important radio resources.

SUMMARY OF THE INVENTION

Therefore, in view of the above problems in the state of the art, one object of the invention is to provide an improved method of paging a large number of devices in a network so that only little traffic due to the paging is generated.

According to one aspect of the invention, a group paging mechanism is introduced for MTC devices (or UEs). In the prior art UEs are paged individually and separately which makes it quite resource expensive to page a great number of UEs at generally the same time. It is realistic that a great number of MTC devices is deployed in a particular area and need to be paged at generally the same time or shall be configured with regard to access restriction parameters. Also one of the key features of MTC devices is that they can be grouped for maintenance and management reasons, whereas the UE are usually not grouped Groups of MTC devices can be formed based on any kind of criteria, such as belonging to the same MTC feature, APN, server, subscriber, or having the same transmission trigger mechanism etc. A particular MTC device may belong to several groups. For each group a corresponding group ID is generated, and each MTC device is assigned the group IDs of the groups to which it belongs. The MTC devices listen to the paging channel at particular paging occurrences, i.e. at particular paging frames and subframes. For each group a particular group paging resource indication is defined, which allows the MTC device and the radio control entity to calculate the channel resources on which the paging message is sent. The MTC device is assigned with the group paging resource indication of only one group to which it belongs. In others words, if a particular MTC device belongs to groups 1, 2, 3 and 4, then the group paging resource indication of for example group 4 is assigned to the MTC device.

In order to page the MTC devices of a particular group, the network will analyze all MTC devices making up said group and will infer how many paging messages are to be transmitted to reach and page every MTC device of said group. The number of paging messages depends on the number of paging occurrences which the MTC devices of the group listen to. The network will generate a paging message for each paging occurrence used by the MTC devices within the MTC group which is to be paged. Correspondingly, each paging message will include a different group paging resource indication, but the same group ID. The paging message is then transmitted from the paging entity in the network to the radio control entity(ies) to which the MTC devices are attached The radio control entity will broadcast another paging message over the radio interface per received paging message at the channel resources calculated based on the group paging resource indication received in the paging message from the MME. Thus, all MTC devices belonging to a particular group, see their own group ID in the paging message and infer therefrom that the paging message is addressed to them. Less paging messages are used and thus resources in the core network and over the radio interface are saved. The resource saving is particularly significant when large groups of MTC devices are paged.

At least one of the above objects is solved by the subject matter of the independent claims. Advantageous embodiments of the invention are subject-matters of the dependent claims.

Furthermore, it would be advantageous to have a method for controlling the establishing of connection between a plurality of devices and a network such that peaks of connections are avoided.

One embodiment of the invention provides a method for paging a first group of devices, attached to at least one radio control entity (eNB) in a network. A group paging target identity (group pseudo ID) and a group paging resource indication (GrMTC_ID) are assigned to all devices of the first group. An entity (MME) in the network transmits a first paging message to the at least one radio control entity, the first paging message comprising the group paging target identity and the group paging resource indication. The at least one radio control entity calculates transmission resources on a radio channel based on the received group paging resource indication. The at least one radio control entity transmits a second paging message comprising the group paging target identity at the calculated transmission resources of the radio channel. The devices of the first group receive the second paging message at the calculated transmission resources of the radio channel.

According to an advantageous embodiment of the invention, devices of a second group attached to the at least one radio control entity are to be paged. The group paging target identity is assigned to the devices of the second group. A second group paging resource indication is assigned to the devices of the second group used by the devices of the second group to calculate the radio channel resources to receive paging messages. The second group paging resource indication is determined such that a re-transmission of the second paging message transmitted for the first group of devices is received by the devices of the second group.

In a further embodiment of the invention the radio control entity performs re-transmissions of the second paging message based on a cycle parameter. The cycle parameter corresponds to the difference between the group paging resource indication of the first group of devices and the second group paging resource indication of the second group of devices.

For another embodiment of the invention the devices of the second group use a second cycle parameter for calculating the radio channel resources to receive paging messages. The second cycle parameter is double the amount of the cycle parameter used by the radio control entity.

According to another embodiment of the invention, devices of at least a second and a third group attached to the at least one radio control entity are to be paged. A second group paging target identity is assigned to the devices of the first group, second group and third group. A second group paging resource indication is assigned to the devices of the second group used by the devices of the second group to calculate the radio channel resources to receive paging messages. The second group paging resource indication is determined such that a re-transmission of the second paging message transmitted for the first group of devices is received by the devices of the second group. A third group paging resource indication is assigned to the devices of the third group used by the devices of the third group to calculate the radio channel resources to receive paging messages. The third group paging resource indication is determined such that a second re-transmission of the second paging message transmitted for the first group of devices is received by the devices of the third group. The third group paging resource indication differs from the second group paging resource indication by the same amount as the second group paging resource indication differs from the group paging resource indication. The devices of the first, second and third group use a second cycle parameter for calculating the radio channel resources to receive paging messages. The second cycle parameter is three times the amount of the cycle parameter used by the radio control entity.

Another embodiment of the invention refers to wherein the group paging target identity as being part of a group international mobile subscription identity (pseudo IMSI) for the devices of the first group. The group international mobile subscription identity further comprises parameters specific to the devices of the first group. The parameters preferably indicate an access restriction to the network for the devices of the first group.

In a further embodiment of the invention the parameters in the group international mobile subscription identity indicates a time for which the devices of the first group shall postpone the connection to the network after having received a paging message instructing the devices of the first group to connect to the network.

According to an advantageous embodiment, the devices of the first group decide whether the second paging message is destined to the first group of devices based on the group identity comprised within the group paging target identity. The devices of the first group decide whether to adopt the parameters comprised within the group paging target identity or to transit from an idle state into a connected state, based on the parameters comprised within the group international mobile subscription identity.

In another embodiment of the invention the entity in the network assigns the group paging target identity and the group paging resource indication to the devices of the first group during an attach procedure of the devices of the first group to the network. When devices of the first group detach from the network, the entity in the network and the devices maintain the group paging target identity and the group paging resource indication stored.

For a further embodiment of the invention a device of the first group which is detached from the network listens at resources of a radio channel, calculated based on the stored group paging resource indication, for paging messages transmitted by the at least one radio control entity. The paging messages include the group paging target identity for the first group.

According to an advantageous embodiment of the invention, when the devices of the first group detach from the network, the entity in the network and the devices of the first group store the group paging target identity and a predefined paging resource indication. A device of the first group which is detached from the network listens at the predefined paging resources of a radio channel for paging messages transmitted by the at least one radio control entity, the paging messages including the group paging target identity for the first group.

In another embodiment of the invention the detached devices of the first group monitor the radio channel at the resources for paging messages directed to the first group of devices.

For a different embodiment of the invention, a different international mobile subscriber identity is assigned to each device. Each device of the first group calculates radio channel resources for receiving paging messages based on the group paging resource indication of the first group and/or based on the international mobile subscriber identity.

Referring to another embodiment of the invention, the second paging message comprises the international mobile subscriber identity of a device when paging said device alone, or comprises the group paging target identity when paging all devices of the first group.

A different embodiment of the invention involves that a device belongs to at least two different groups of devices being identified by two different group paging target identities, and wherein the device is assigned one of the two different group paging target identities.

An embodiment of the invention also provides a paging entity in a network for paging a first group of devices attached to at least one radio control entity in the network. A group paging target identity and a group paging resource indication are assigned by the paging entity to all devices of the first group. The paging entity comprises means for assigning a group paging target identity and a group paging resource indication to all devices of the first group. A transmitter of the paging entity transmits a first paging message to the at least one radio control entity, the first paging message comprising the group paging target identity and the group paging resource indication. The group paging resource indication is used by the radio control entity to calculate transmission resources on a radio channel to transmit a second paging message on the radio channel to be received by the devices of the first group.

In another embodiment of the invention the assigning means of the paging entity further assign a second group paging target identity to devices of the first group, second group and third group. The assigning means also assign a second group paging resource indication to the devices of the second group, wherein the second group paging resource indication is used by the devices of the second group to calculate the radio channel resources to receive paging messages. A processor of the paging entity determines the second group paging resource indication such that a re-transmission of the second paging message transmitted for the devices of the first group is received by the devices of the second group. The assigning means assign a third group paging resource indication to devices of the third group, wherein the third group paging resource indication is used by the devices of the third group to calculate the radio channel resources to receive paging messages. The processor determines the third group paging resource indication such that a second re-transmission of the second paging message transmitted for the first group of devices is received by the devices of the third group. The third group paging resource indication differs from the second group paging resource indication by the same amount as the second group paging resource indication differs from the group paging resource indication.

According to a further embodiment of the invention the devices of the first, second and third group use a second cycle parameter for calculating the radio channel resources to receive paging messages. The second cycle parameter is three times the amount of the cycle parameter used by the radio control entity to calculate the radio channel resources on which to broadcast the second paging messages. The assigning means assign the second cycle parameter to the devices of the first, second and third group. The transmitter transmits the paging message to the at least one radio control entity, including the cycle parameter to be used by the radio control entity.

In a further embodiment of the invention, when devices of the first group detach from the network, the paging entity maintains the group paging target identity and the group paging resource indication stored.

An embodiment of the invention further provides a device belonging to a first group of devices attached to at least one radio control entity in a network and being paged by an entity in the network. A group paging target identity and a group paging resource indication are assigned to all devices of the first group. A receiver of the device receives the assignment of the group paging target identity and the group paging resource indication from the entity in the network. A processor of the device calculates resources of the radio channel at which the radio control entity will transmit a paging message based on the assigned group paging resource indication. The receiver receives the paging message from the radio control entity at the calculated resources of the radio channel, the paging message including the group paging target identity. The processor matches the received group paging target identity with the assigned group paging target identity to determine if the paging message is destined to the first group.

Regarding a further embodiment of the invention, the group paging target identity is part of a group international mobile subscription identity for the devices of the first group. The group international mobile subscription identity further comprises parameters specific to the devices of the first group. The paging message received by the device from the radio control entity comprises the group international mobile subscription identity. The processor extracts the parameters encoded within the group international mobile subscription identity.

According to another embodiment of the invention the processor decides whether to adopt the parameters comprised within the group international mobile subscription identity or to transmit from an idle state into a connected state, based on the parameters comprised within the group international mobile subscription identity.

In a further embodiment of the invention, when the device detaches from the network, the device maintains the group paging target identity and the group paging resource indication stored.

For an advantageous embodiment of the invention the device which is detached from the network listens at resources of a radio channel calculated based on the stored group paging resource indication, for paging messages transmitted by the at least one radio control entity. The paging messages include the group paging target identity for the first group.

In another embodiment of the invention, when the device detaches from the network, the device stores the group paging target identity and a predefined paging resource indication. The processor calculates radio channel resources based on the predefined paging resource indication, and the receiver listens at the calculated radio channel resources for paging messages transmitted by the at least one radio control entity, when the device is detached from the network. According to one aspect, devices usually connect to the network when a particular condition is fulfilled, such as repeatedly at a particular time or after a power outage. This would lead to a peak of connections by said devices, since effectively all of said devices would try to connect to the network at the same time. In order to avoid this peak, the connection of the devices to the network is distributed over a time period after the trigger. In other words, the devices do not connect to the network at the same particular time but during a determined period of time.

In more detail, all devices in a particular network are divided into different groups, depending on the trigger event that trigger their connection to the network. Thus, all devices in one group are triggered at the same time by the same condition and would therefore cause a connection establishment peak, which is to be avoided. Each group is identified by a group identifier, which is known to both the device and an entity of the network.

In order to avoid the connection peak, each device delays its connection attempt by a particular period of time, wherein the delay should be advantageously different for each or most devices. Thus, though all devices are triggered to connect to the network at the same time, each or most devices actually connect to the network at a different time after said trigger. Naturally, the calculated delay times may be the same for some of the devices, as long as the congestion and connection peak is avoided.

Each device calculates its own delay time and delays the connection attempt by said calculated delay time. In order for each device to be able to calculate the delay time, configuration information may be transmitted from an entity in the network to the device(s).

Whether and how the connection of the devices to the network is to be distributed over time may depend on various factors, such as the number of devices in the network, other mobile nodes in the network or the current load in the network. The entity of the network, capable of determining these factors may transmit the necessary information to the device(s), which in turn determine their connection delay, which is to be introduced as soon as the connection trigger occurs, based on said received information. As already said before, the delay time need not be different for each and every device; for instance, every fifth device may have the same delay time and thus connect at the same time. For how long the devices are to be delayed thus also depends on the configuration by the network administrator.

One possibility to calculate the delay time is that an entity of the network determines a maximum delay time over which the device connections are to be distributed after a trigger event. This maximum delay time may depend for example on the number of devices, on the currently available resources in the network and/or a collision probability threshold. Said maximum delay time is transmitted to the devices, which then randomly select a delay time which is larger than 0 and less than the maximum delay time. Instead of selecting the specific delay time randomly, another possibility in said respect is that the calculation of the delay time by each of the devices is based on a parameter which is unique for each device, such that each device calculates a different delay time depending on said unique parameter.

Alternatively, instead of transmitting the maximum delay time to the devices, the entity of the network may transmit information to the devices on which basis the devices themselves can calculate the general maximum delay time and then its own specific delay time. Put differently, the calculation of the specific delay time may be conducted entirely in the devices, in which case the devices are to be only informed about information relevant to said calculation, such as the number of devices in the group and/or the available resources.

In general, the devices of a group need to be configured if they should delay the connection to the network upon a trigger event, and if yes, for how long. Since the conditions in the network and thus the probability of a connection peak and congestion in the network change over time, it is advantageous to continuously update the configuration of the devices in a group in said respect. For instance, if the number of devices in a group decreases below a threshold, there might be no need any more for the peak avoidance scheme described above. The devices need to be configured accordingly by providing corresponding information to them. Or a collision probability with other mobile nodes in the network increases such that the connection attempts of devices in a group should be distributed over a longer time to ascertain that any congestion and collision is avoided.

The configuration information shall be transmitted from the network entity to the devices together with the group ID to ensure that only those devices belonging to the indicated group adopt the new configuration parameters.

There are various possibilities as to how to transmit the configuration information from the network to the devices. This partly depends on the connection status of the device, i.e. on whether the device is connected to the network and exchanging data, or whether the device is in IDLE-mode, i.e. not exchanging data with the network but listening to a paging channel, or whether the device is in a detached mode where neither data is exchanged nor paging is usually possible.

In case the device is already connected to the network and the configuration information is to be updated, it is possible to transmit the new configuration information from the network to the device as "normal" downlink data. Or the configuration information may be multicast to all devices and only those devices of the group according to the group identifier process and adopt the new configuration information. The configuration information may also be broadcast to the devices as part of the system information.

Still another possibility is that the paging mechanism of the network is used, and the configuration information is transmitted in the paging record as a pseudo International Mobile Subscriber Identity (IMSI) or pseudo SAE-Temporary Mobile Subscriber Identity (TMSI). In said case, the pseudo IMSI or S-TMSI encode the group ID and the actual configuration information.

Since devices being in IDLE mode are not connected as such to the network and do not receive data from it, they cannot be informed about a new configuration within normal downlink data. Devices in IDLE mode however can be paged and may also receive system information. Therefore, the configuration of the device may be paged to the devices via a pseudo IMSI or S-TMSI or broadcast within system information.

A detached device would usually not receive downlink data, multicast data, paging information or system information and thus could not be updated with new configuration information for the delayed establishment of a connection to the network. In order to update a detached device, the detached device would at least need to listen to the paging channel to identify a corresponding paging record and an included pseudo IMSI or TMSI.

One aspect provides a method for controlling the establishing of connections between a plurality of devices and a network. The devices are respectively divided into a plurality of groups based on a condition at which the establishing of a connection by the devices to the network is triggered. Configuration information is transmitted from an entity in the network to devices of a first group of the plurality of groups to configure the establishing of a connection to the network. Each device of the first group determines a specific delay time, based on the received configuration information, wherein the determined delay time is not the same for each device of the first group. When the condition of the first group triggers the establishing of the connection to the network, each device of the first group delays the establishing of the connection to the network by the determined delay time.

According to an advantageous aspect, the configuration information comprises a maximum delay time, and each device randomly selects a delay time between 0 and the received maximum delay time.

In a further aspect, the delay time for each device of the first group is determined based in addition on a particular parameter which is unique for each device of the first group. An example for such a parameter is an identity parameter of each device of the first group.

For an additional aspect, the configuration information comprises a Duration parameter (D) and an Allowed Devices parameter (A), and each device of the first group determines its own delay time in accordance with the following formula:

delay time=((particular parameter unique for the device)mod($D$))/($A$).

With regard to another aspect, the configuration information comprises a collision parameter and the number of devices in the first group, and each device of the first group determines its own delay time in accordance with the following formula:

delay time=(maximum delay time)/(number of devices in the first group)*((particular parameter unique for the device)mod(number of devices in the first group))

The maximum delay time is calculated by the device based on the collision parameter.

According to a further aspect, the groups are identified by different group identifiers. An entity of the network determines for a particular device the group to which said particular device belongs. The group identifier identifying the determined group is then transmitted to said particular device.

In an advantageous aspect the plurality of groups are identified by different group identifiers, and subscription information of each device comprises a group identifier identifying the group to which said device belongs.

For a different aspect, the configuration information is transmitted together with the group identifier of the first group, ensuring that only devices of the first group process the configuration information.

Referring to a further aspect invention, the first group is identified by different group identifiers in different areas. A device, moving from one area into the particular area in which the network is located, is assigned the group identifier of the first group in the particular area in which the network is located.

According to a more detailed aspect, the group identifier, assigned to the device moving into the particular area in which the network is located, is transmitted to said device using a paging mechanism.

In one aspect the configuration information is transmitted to each device of the first group as direct downlink data, or using a multicast or broadcast mechanism, or via a radio control entity in the network using a system information broadcast, or using a paging mechanism.

A further aspect allows the configuration information to be transmitted to the devices of the first group as a parameter within a paging record for all devices of the first group.

In another aspect, the parameter within the paging record is a pseudo International Mobile Subscriber Identity (IMSI) for all devices of the first group, and the group identifier of the first group is encoded into the IMSI.

For a more detailed aspect, an International Mobile Subscriber Identity (IMSI), used by the devices in the network, comprises a mobile country code and a mobile network code, which are used for identifying the network. The pseudo-IMSI comprises a pre-defined mobile country code and/or a pre-defined mobile network code which are respectively different from the mobile country code and mobile network code of the IMSI used in the network. Thus, a clash or confusion between a normal IMSI and a pseudo-IMSI is avoided.

Now referring to an advantageous aspect, the devices are informed about the paging record via a paging indication which is paged by a radio control entity of the network to the devices at specific times. The specific times are calculated by the radio control entity based on a paging parameter set by the entity in the network. The paging parameter is transmitted to the devices to allow calculation of the specific times at which the devices are paged.

In a further aspect, the devices are informed about the paging record via a paging indication which is paged by a radio control entity of the network to the devices at specific times. The specific times are calculated by the radio control entity based on the parameter transmitted within the paging record. A second parameter within a second paging record transmitted at a later point time to transmit second configuration information is calculated such that the specific times at which the radio control entity pages the devices does not change.

For another aspect, the parameter within the paging record is a pseudo System Architecture Evolution-Temporary Mobile Subscriber Identity (S-TMSI) for all devices of the first group. The group identifier of the first group is encoded into the S-TMSI.

For some or all aspects invention, the devices are optimized for machine to machine communication.

A further aspect provides a device among a plurality of devices that want to establish a connection to a network. The plurality of devices are respectively divided into a plurality of groups based on a condition at which the establishing of a connection by the devices to the network is triggered. The device belongs to a first group of the plurality of groups. A receiver of the device receives, from an entity of the network, configuration information to configure the establishing of a connection to the network. A processor of the device determines a specific delay time, based on the received configuration information, wherein the determined delay time is not the same for each device of the first group. Further, the processor delays the establishing of the connection to the network by the determined delay time, when the condition of the first group triggers the establishing of the connection of the network.

According to another aspect, the configuration information comprises a maximum delay time, the device randomly selects a delay time between 0 and the received maximum delay time.

In an advantageous aspect the processor determines the delay time based on a particular parameter which is unique for the device.

For a further aspect, the plurality of groups are identified by different group identifiers. The receiver of the device receives a group identifier from an entity of the network, which determines to which group the device belongs depending on the condition on which the device establishes a connection to the network. The group identifier is transmitted together with the configuration information.

Referring to another aspect, the first group is identified by different group identifiers in different areas. Then, when the device moves from the current area into a different area, the group identifier used in said different area for identifying the group to which the device belongs is assigned to the device.

In a further aspect the group identifier used in said different area is transmitted to the device using a paging mechanism.

According to a different aspect the receiver receives the configuration information as direct downlink data or using a multicast or broadcast mechanism or using a system information broadcast or using a paging mechanism.

For another aspect the receiver receives the configuration information using the paging mechanism as a parameter in a paging record for all devices of the first group. The parameter is a pseudo International Mobile Subscriber Identity (IMSI) or a pseudo System Architecture Evolution Temporary Mobile Subscriber Identity (S-TMSI), and the group identifier is encoded into the IMSI or S-TMSI.

A further aspect provides an entity in a network to which a plurality of devices are to establish a connection. The devices are respectively divided into a plurality of groups based on a condition at which the establishing of a connection by the devices to the network is triggered. A processor of the entity determines configuration information such that each device of a first group out of the plurality of groups can determine a specific delay time based on the configuration information. The determined delay time is not the same for each device of the first group, and is used by each device of the first group to delay the establishing of the connection to the network by the determined delay time. A transmitter of the entity transmits the configuration information to devices of the first group.

According to an advantageous aspect, the configuration information comprises a maximum delay time. The processor of the entity determines the maximum delay time based on information on the number of devices in the first group and/or the load in the network.

In another aspect the processor of the entity determines the group to which said particular device belongs. The transmitter of the entity further transmits the group identifier identifying the determined group to said particular device, upon the determination of the group.

For a different aspect, the transmitter of the entity transmits the group identifier together with the configuration information to the devices of the first group.

Another aspect deals with the transmitter of the entity transmitting the configuration information to the devices of the first group as direct downlink data or using a multicast or broadcast mechanism or using a system information broadcast or using a paging mechanism.

A further aspect provides a radio control entity of a network to which a plurality of devices are to establish a connection. The devices are respectively divided into a plurality of groups based on a condition at which the establishing of a connection by the devices to the network is triggered. A receiver of the radio control entity receives from an entity of the network configuration information which is such that each device of a first group out of the plurality of groups can determine a specific delay time based on the configuration information. The determined delay time is not the same for each device of the first group, and is used by each device of the first group to delay the establishing of the connection to the network by the determined delay time. A transmitter of the radio control entity transmits the received configuration information to devices of the first group using a system information broadcast.

BRIEF DESCRIPTION OF THE FIGURES

In the following the invention is described in more detail with reference to the attached figures and drawings.

DETAILED DESCRIPTION

Definitions

Figure 1:
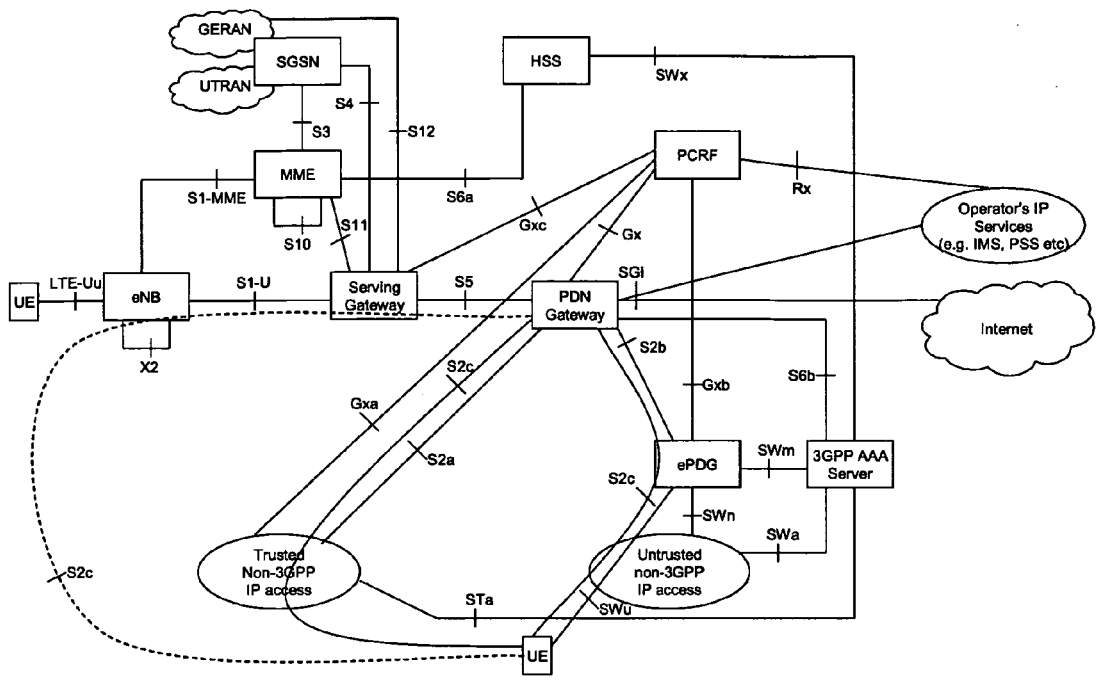
FIG. 1 illustrates the high-level architecture of an LTE system.
Figure 2:
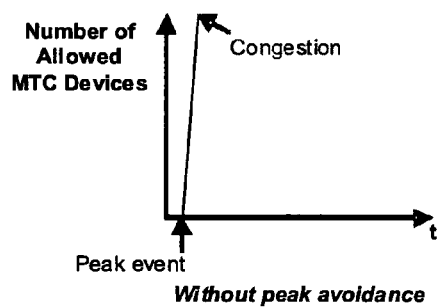
FIG. 2 is a diagram illustrating the connection peak when no peak avoidance is applied, upon a trigger event triggering the simultaneous connection of all MTC devices of a group.
Figure 3:
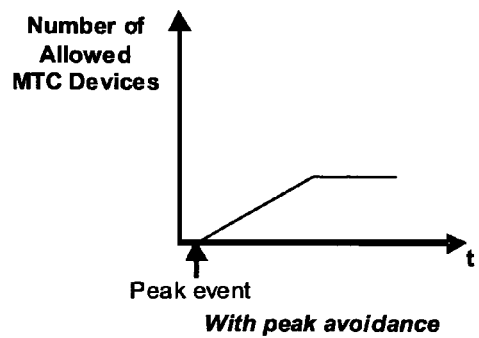
FIG. 3 is a diagram similar to FIG. 2, illustrating the effect of peak avoidance when a trigger event triggers the simultaneous connection of all MTC devices of a group.

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

An MTC device may be understood as a functional entity within a communication network, which may or may not be co-located with a mobile node. The MTC device is adapted or optimized to the requirements of Machine-Type communications.

Paging in its general meaning is may be understood as seeking a mobile terminal (UE or MTC device) within an amount of cells, where the mobile terminal stays in IDLE state. However, embodiments of this invention introduce a new function of the paging mechanism in that it is used to convey particular information such as configuration parameters to the UE/MTC devices.

In the following, several embodiments of the invention will be explained in detail. The explanations should not be understood as limiting the invention, but as a mere example of the general principles of the invention. A skilled person should be aware that the general principles of the invention as laid out in the claims can be applied to different scenarios and in ways that are not explicitly described herein.

MTC devices are deployed in a specific area for a specific function and may need to transmit data at particular intervals or more generally when a condition for the transmission applies, e.g. in case an alarm function is implemented. When no transmission is to be done, the MTC devices need not be connected to the network, and may be in IDLE or DETACHED mode. In order for MTC devices to perform an uplink transmission, an uplink transmission needs to be scheduled and an uplink transmission timing usually needs to be synchronized.

In said respect, the Random Access Channel (RACH) plays a key role as an interface between non-synchronized UEs or MTC devices and the orthogonal transmission scheme of the LTE uplink radio access. The RACH is used by a UE or MTC device in RRC_CONNECTED state to achieve uplink synchronization, or during handover to a new cell or for a transition from RRC_IDLE to RRC_CONNECTED state. In case of a radio link failure, MTC devices in connected mode loose uplink synchronization and thus may also need to synchronize by connection to the RACH.

The random access procedure allows of contention-based and contention-free random access. Contention-based access can be used in all mentioned cases, contention-free access can be triggered by the eNB in case of downlink data arrival during RRC_CONNECTED state requiring random access or in case of handover to a new cell. For contention-based random access, a preamble signature is randomly chosen by the UE or the MTC device and used on the RACH, i.e. there is the possibility of a collision if different UEs or MTC Devices use the same preamble signature at the same time. This leads to the need of subsequent contention resolution process.

In case of contention-free random access, a dedicated preamble signature is allocated to the UE or MTC device by the eNB and thus collision is not possible. This is faster than contention-based access, which may become important for cases that are time critical.

In order to illustrate the embodiments of the present invention, a scenario is assumed in which a plurality of MTC devices are deployed in a confined area, and the MTC devices are triggered to perform a transmission by the same condition, such as a periodical interval. In case the number of MTC devices is excessively large and/or the load of the network to which the MTC devices will transmit data is high because of other UEs in the area, a connection peak is generated by the MTC devices when they are triggered at the same time to perform the transmission. In more detail, it is assumed that the MTC devices are in IDLE or DETACHED mode and thus first need to synchronize the uplink via the RACH. Thus, at a particular time all the MTC devices will access the RACH at the same time and thus generate congestion in the network.

According to an embodiment of the invention, MTC Devices that may generate a peak under certain trigger conditions are categorized into different groups depending on said conditions. The conditions are for example power outage, periodic signalling, etc. Therefore, all devices within a particular group are triggered by the same event. This categorization may be part of the subscription of the MTC Device, i.e. may be pre-configured for each MTC device. Alternatively, the MME may determine the category based on other information, such as a combination of requested Access Point Name (APN) and subscribed MTC feature. The APN corresponds to the network the MTC Devices are connected, and it could be the case that all metering devices are connected to the same network, e.g. the network of the utility company while all vending machine devices are connected to a same network, different from the network to which the metering devices are connected, e.g. the network of the vending machine operator.

An MTC device may also be part of different categories at the same time, for example if the MTC devices will transmit data based on various conditions.

In order to avoid those connection peaks, according to the embodiment of the present invention, the MTC devices will be dynamically informed about when they are to access the RACH.

Each MTC device will delay its RACH access by a particular period of time so that no peak of connections to the RACH is generated, but the connections are evenly distributed over a particular period of time after the trigger condition applies. In order for the connections to be in general evenly distributed over time, each or most of the MTC devices should delay its RACH access by a different time.

The delay time, i.e. the time each MTC device delays the connection to RACH after a trigger condition applies, may be calculated in the MTC device itself. The MME notifies the MTC devices about the parameters relevant for the proper calculation of the delay time.

One possibility of calculating the delay time is that the MME sends a maximum backoff time to the MTC devices. In case of a peak event, i.e. the trigger condition applies, each MTC device determines a random value in the interval of 0—maximum backoff time as actual backoff time, specific for each device. Since the delay time of each MTC device is calculated randomly, most of the MTC devices will have selected a different delay time and thus will connect to the RACH at a different point in time thus avoiding a peak of connections and a congestion of the network.

The maximum delay time transmitted from the MME may be calculated based on various factors, such as the number of devices in the network, other mobile nodes in the network or the current load in the network. The MME is able to estimate the load in a cell based on

- Information like established RRC connections, number of bearers, radio resource utilization, etc received from the eNB, e.g. via O&M performance measurements
- The SGW knows uplink/downlink load at the eNBs and informs the MME, e.e. if the load in one eNB is above a threshold
- The MME knows the number of IDLE UEs/devices in a Tracking Area and can determined the expected number of active UEs/devices in case of a peak event The MTC devices that are detached (and e.g. subscribed to low mobility feature) can be also considered by the MME in the same ways as IDLE devices, in case the context for those devices is still stored in the MME, When randomly calculating the delay time, the network has little control over the access behaviour due to the random function on the MTC device.

Therefore, another possibility to calculate the delay time by the devices based on a parameter that is different for each device, thus ensuring that the calculation result of the delay time is different between the devices, but is predictable due to known unique parameter used in the calculation. For instance, an International Mobile Subscriber Identity (IMSI) may be used in said respect.

In the following an example of such a calculation is given. The MTC devices are informed about a Duration parameter D and optionally an Allowed Devices parameter A. After a congestion category event has occurred, an MTC device determines when it is allowed to access the network based on the two parameters. The MTC device calculates the actual back off time $T_{backoff}$=(IMSI mod D)/A. The backoff time can be e.g. in seconds or 0.1 seconds, and the unit can be transmitted to the MTC devices as well. One property of calculating the delay by using a particular parameter of each device, is that the order in which the devices attach to the RACH remains always the same.

So as to avoid this invariable order, a different (random) value can be used for D in addition to an aligned A (e.g. A=D/max backoff). Then, it is possible to randomize which MTC Devices are allowed to start at what time and it can be avoided that always the same MTC Devices will access the network first. Furthermore, here, in case the network is aware of the point in time of the peak event (e.g. noticed power failure or informed about the event from MTC devices or other entities) the network can also calculate $T_{backoff}$ based on the IMSI, the values D, A and check if the MTC device is allowed to access the network or not at the point in time.

A different mechanism to calculate the delay time is that the MME may want to assure that the collision probability among the UEs and MTC devices in a cell in case of a peak event is below a specific value, e.g. at maximum 1% higher compared to the normal collision probability without MTC devices. With the collision probability per UE per time slot $p_{coll}^{ue}(G,L)$ and the available resources per time slot L, the access attempts load G can be estimated by G=−L ln(1−$p_{coll}^{ue}$(G,L)). I.e. in case of 10 MHz Bandwidth with two RACH slots per radio frame (each providing 64 signature preambles) and $p_{coll}^{ue}$(G,L)=0.02, it follows G=1.2930 (−64*ln(1−0.02)) per slot, and further it follows for the access attempts load per radio frame (i.e. within 10 ms)=2.5859, i.e. 259 attempts per second. In case of 1% higher collision probability in case of peak of MTC devices, the MTC device load $G_{MTC}$ can be estimated by $$G_{MTC} = -L\ln(1 - p_{coll}^{all}(G, L)) + L\ln(1 - p_{coll}^{ue}(G, L)) = -L\left(\ln\left(\frac{1 - p_{coll}^{all}(G, L)}{1 - p_{coll}^{ue}(G, L)}\right)\right)$$

Thus, either the MME determines the parameters D and A above based on the formula (in case the MME is aware of the RACH configuration) or the configuration information sent from the MME to the MTC devices may comprise information about the number of (expected) MTC devices of a group in the area (e.g. cell) and the increased collision probability either in form of a probability value only valid for the MTC devices (if the MTC devices are aware of the normal collision probability $p_{coll}^{ue}$(G,L)) or in form of factor $$\left(\frac{1 - p_{coll}^{all}(G, L)}{1 - p_{coll}^{ue}(G, L)}\right).$$

The MME triggers the notification of the MTC devices including a group ID and the information about the number of MTC devices of that group and the increased collision probability. In case a MTC device wants to access the network due to an event that may cause a peak, it determines a back off time until it is allowed to access the network based on the broadcasted access behaviour information, broadcasted information about available resources per time slot and for example local parameters as the International Mobile Subscriber Identity (IMSI). In case of the above scenario with normal collision probability of 2% and 1% higher collision probability with MTC devices, with two RACH slots per radio frame with 64 signature preambles per slot, it follows an additional load per radio frame of 1.3128. I.e. for example with 1313 MTC devices of the group in the area, the devices need to spread their access over the maximum delay time of 10 seconds. Each MTC device may determinate its back off time (in seconds) by $$T_{backoff} = \frac{10}{1313}(IMSI \bmod 1313)$$

and the MTC devices distribute their access to the network over time and thus congestion in case of a peak event is avoided.

As discussed above, information is transmitted from the MME to the MTC devices for them to calculate their particular delay time, $T_{backoff}$. The transmission may be performed in various ways also depending on the current connection state of the MTC device(s).

One possibility to deliver the access behaviour information to the MTC devices is to send it as normal downlink data e.g. as part of an MTC application or alternatively as information included in NAS signalling (e.g. Tracking Area Update, Bearer Modification, etc.). In these cases every MTC device of the respective group needs to be in CONNECTED state in order to be able to receive the data. This increases the power consumption and the load of the network especially if a large group of MTC Devices needs to be updated.

Another solution is to send the data as part of a broadcast or a multicast transmission (e.g. MBMS, CBS). With CBS, the MME may send the location information, group ID and the parameters to a cell broadcast center (CBC) and the CBC transmits a broadcast message to the MTC devices in the location at a defined repetition interval. The MTC devices can read the cell broadcast messages even if they are not connected to the network. However, this requires support of the broadcast or multicast mechanism and therefore increases complexity of the MTC devices and costs for the operator. In addition, for some multicast mechanisms the MTC devices need to be in CONNECTED state as well. According to a further possibility, the access behaviour information can be transferred via an enhanced System Information Broadcast (SIB). The MME may send the information about the group ID and the appropriate parameters to the eNBs in an enhanced S1-AP message and the eNB broadcasts the information via SIB. The enhanced S1-AP message could be a new S1-AP message type or a warning message transmission message or eNB configuration transfer message extended to also include optionally the required information.

One problem of the solution using SIB is that the eNBs must be changed in order to be able to receive the new access behaviour parameters from the MME and also to be able to signal the new parameters via SIB dynamically to the MTC devices, i.e. it is not possible to avoid a peak in a radio access network with legacy eNBs, because they do not support the transfer of those new parameters.

In order to avoid peaks of MTC devices when legacy eNBs are deployed, the MME may use NAS signalling (e.g. attach or tracking area update) to inform the MTC Devices about the group ID and also the access behaviour information, as already mentioned above.

In order to also update IDLE or DETACHED MTC devices dynamically with new parameters, the paging mechanism may be used.

Normal paging of a UE works as follows. The UE or MTC device is monitoring the Physical Downlink Control Channel (PDCCH) for an indication of a paging message, i.e. a Paging Radio Network Temporary Identity (P-RNTI). The UE only needs to monitor the PDCCH channel at certain UE-specific occasions, i.e. at specific subframes within specific radio frames. At other time, the UE may apply discontinued reception, thus switching off its receiver to preserve batter power. Put differently, rather than providing different paging identifiers for different groups of UEs, different UEs monitor different subframes for their paging messages.

The occasions to be monitored in the PDCCH are specific subframes, Paging occasions (PO), in a paging frame (PF). The PF is calculated as follows:

$$SFN \bmod T = (T \operatorname{div} N)*(UE\_ID \bmod N)$$

The PO is derived from a subframe pattern using the index i_s with:

$$i\_s = \operatorname{floor}(UE\_ID/N) \bmod Ns$$

The following Parameters are used for the calculation of the PF and i_s:
T: DRX cycle of the UE. T is determined by the shortest of the UE specific DRX value, if allocated by upper layers, and a default DRX value broadcast in system information. If UE specific DRX is not configured by upper layers, the default value is applied.
nB: 4T, 2T, T, T/2, T/4, T/8, T/16, T/32 (number of paging subframes per frame)
N: min(T,nB)
Ns: max(1,nB/T)
UE ID: IMSI mod 1024

Both the eNB and the UE need to know the paging occasion. Therefore, the UE can calculate the paging occasion from its IMSI.

The paging indication on PDCCH is indicating to a resource block in the Physical Downlink Shared Channel (PDSCH) carrying the paging message. The paging message is including a paging record for each paged UE and the paging record includes the UE identity (i.e. the IMSI or S-TMSI).

According to an embodiment of the invention, the MTC devices listen to the PDCCH for a P-RNTI which then indicates to the corresponding resource block in the PDSCH. The paging record on the PDSCH comprises the configuration information, for instance in form of a pseudo IMSI that encodes the group ID and the new parameters.

The normal IMSI is composed of the Mobile Country Code (MCC, 3 digits), Mobile Network Code (MNC, 2 or 3 digits) of the mobile network operator and the Mobile Subscriber Identification Number (MSIN, 10 or 9 digits depending on the length of the MNC).

Figure 4:
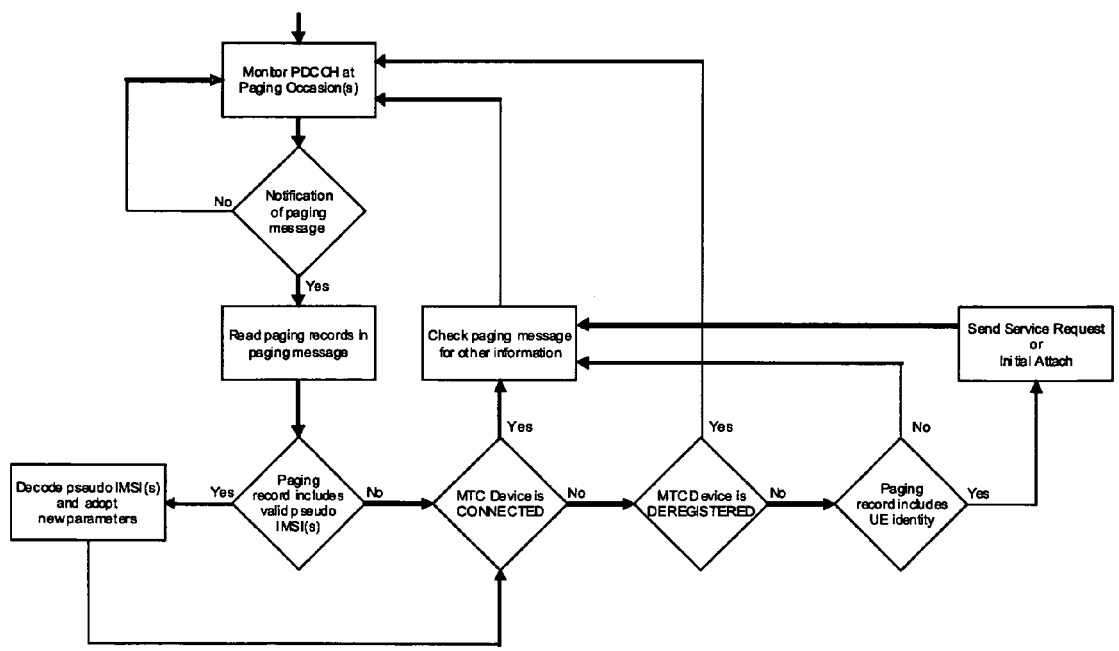
FIG. 4 shows a flow chart of a paging procedure of an MTC device receiving configuration information for peak avoidance.

FIG. 4 shows the flowchart of the MTC device behaviour regarding the paging procedure according to an embodiment of the invention. During the initial attach procedure or during a TAU (Tracking Area Update) procedure the MTC device receives the associated group ID(s). Then, the MTC device determines the paging occasions according to its IMSI and possible pseudo IMSIs (both not shown in the flow chart because the group ID(s) and thus the paging occasions may change). Put differently, each MTC device repeatedly listens to the PDCCH at two paging occasions, one for the usual IMSI and one for the pseudo IMSI. As explained later, the paging occasion can be calculated by the MTC devices based on a UE_ID determined by the MME and transmitted to the MTC devices, instead of using the pseudo IMSIs.

The MTC device monitors the paging channel at the paging occasions and in case a P-RNTI is received by the MTC device, the MTC device reads the corresponding paging records on the resource block in the PDSCH as indicated by the paging on the PDCCH. The MTC device checks whether the paging records include valid pseudo IMSI(s), i.e. a pseudo IMSI encoding the group identifier for the group to which the MTC device belongs. Naturally, In case the paging occasion did not correspond to a paging occasion of a pseudo IMSI, the MTC device may skip to check whether a pseudo IMSI is included.

In case pseudo IMSI(s) for its group were included, the MTC device adopts the new configuration parameters, such as a new number of MTC devices.

Then, if the MTC device is in CONNECTED state, it checks whether other information are included in the paging message (e.g. notification of change of system information) and continues to monitor the PDCCH. Otherwise, if the MTC device is DEREGISTERED it does not further check the paging records but continues monitoring the paging channel. In case the MTC device is not DEREGISTERED but IDLE, it checks whether a paging record includes a UE identity (IMSI or S-TMSI), where in case the paging occasion did not correspond to a paging occasion of the IMSI, the MTC device may skip to check whether the IMSI or a S-TMSI is included.

In case a valid S-TMSI of the MTC device is included, it sends a Service Request, in case the IMSI of the MTC device is included, it performs an initial attach. The MTC device proceeds with checking the paging message for other information and continues to monitor the paging channel.

Thus, the MTC devices are monitoring the PDCCH at particular paging occasions, and in addition to their normal UE identity (IMSI or SAE Temporary Mobile Station Identifier (S-TMSI)) they are also checking whether a pseudo IMSI related to their affiliated group is notified on the PDSCH as indicated by the P-RNTI on the PDCCH at the paging occasion calculated based on the pseudo IMSI or pre-determined UE_ID. In case a valid pseudo IMSI is detected by the MTC devices, they are not responding to the paging but adopting the included new parameters.

The paging is done by the MME which distributes a paging request to the relevant eNB based on the tracking areas. When receiving the "Paging Request" from the MME, the eNB sends a page over the radio interface PDCCH channel.

The paging occasion for a particular device is calculated based on the IMSI of the device.

Therefore, different IMSI values may result in different values for the PF and i_s. The pseudo IMSI encodes the group ID and configuration parameters, and with changing parameters over time, the pseudo IMSI may have different values for a single group depending on the encoded parameters. If the different possible IMSI values for a group would result in different values for PF and i_s, the MTC devices of that group would have to monitor all possible paging occasions and this would result in high overhead and power consumption.

However, in the current 3GPP specification in case of normal paging, the MME notifies the eNB explicitly about the UE_ID, i.e. the MME determines the UE_ID from the IMSI and the eNB determines the paging occasion based on the received UE_ID. Therefore, in case of paging with a pseudo IMSI, the MME can send the pseudo paging message with a UE_ID to the eNB with UE_ID ≠ pseudo IMSI mod 1024. Thus, different pseudo IMSIs would not result in different paging occasions. In this case the MTC device should also not use the pseudo IMSI to determine the paging occasion but should be notified about the UE_ID used by the MME for paging the pseudo IMSI. One possibility is that the UE_ID=group ID.

In case the UE_ID sent to the eNB does not correspond with the pseudo IMSI, it might be that the eNB will not send the paging message in case the eNB verifies whether the UE_ID is correct and consequently rejects the paging message due to the mismatch.

Therefore, another possibility is to use a pseudo S-TMSI (Temporary Mobile Subscriber Identity) instead of a pseudo IMSI. The paging message includes a UE_ID that relates to the group of MTC Devices and is used by the eNB to calculate the paging occasion. In addition, the paging message includes a pseudo S-TMSI that encodes the group ID and the parameters. Based on the group ID the MTC devices may verify that the parameters indeed belong to them.

However, the pseudo S-TMSI comprises only 4 octets compared to the 8 octets of the IMSI.

According to another embodiment of the invention, in order to avoid dependence on eNB implementation and to avoid that the possible pseudo IMSI values for a group result in different values for PF and i_s, it should be ensured that pseudo IMSI(a) mod 1024=pseudo IMSI(b) mod 1024, for a specific group. Put differently, the pseudo IMSIs for a particular group should be generated such that even if different parameters are encoded, the resulting UE_ID=pseudo IMSI mod 1024 always remains the same.

The following table exemplifies how this can be achieved. For this example it is assumed that the configuration information, i.e. the pseudo IMSI shall encode the increased collision probability for the MTC devices, the number of MTC devices in the group and the group specific constant. Consequently, it is assumed for this example that the MTC device knows the remaining parameters to calculate its own delay time based on the above described formulas, such as the maximum collision probability for UE devices.

| Network Operator | MCC/MNC | Increased collision probability | Encoded probability | Number of Devices | Encoded number of Devices | Group specific constant | Pseudo IMSI | UE_ID |
|---|---|---|---|---|---|---|---|---|
| Vodafone Germany | 262 02 | 0.5% | 01024 | 1000 | 01024 | 123 | 262020102401147 | 123 |
| Vodafone Germany | 262 02 | 1% | 02048 | 2000 | 02048 | 123 | 262020204802171 | 123 |
| Vodafone Germany | 262 02 | 1% | 02048 | 3000 | 03072 | 123 | 262020204803195 | 123 |
| Vodafone Germany | 262 02 | 0.5% | 01024 | 3000 | 03072 | 123 | 262020102403195 | 123 |
| NTT DoCoMo Japan | 440 01 | 1% | 02048 | 3000 | 03072 | 123 | 440010204803195 | 123 |
| NTT DoCoMo Japan | 440 01 | 2% | 04096 | 2000 | 02048 | 222 | 440010496002270 | 222 |
| NTT DoCoMo Japan | 440 01 | 2.5% | 05120 | 3000 | 03072 | 222 | 440010512003294 | 222 |
| NTT DoCoMo Japan | 440 01 | 5% | 10240 | 20000 | 20480 | 500 | 440011024020980 | 500 |
| NTT DoCoMo Japan | 440 01 | 10% | 20480 | 50000 | 51200 | 500 | 440012048051700 | 500 |

In more detail, as can be appreciated from the above table, the pseudo IMSI in this particular example is composed of the MCC/MNC in the last five positions, of the encoded collision probability in the next five positions and of the encoded number of devices+group specific constant in the first 5 five positions of the pseudo IMSI. The group specific constant is the group ID, which in the following cases is the same as the pre-determined UE_ID on which basis the paging occasion are calculated.

In this particular example the MCC/MNC actually identify the network and correspond to the MCC/MNC commonly used in said respect. For instance, the MCC 262 refers to Germany and the MNC to Vodafone. To encode the additional collision probability multiples of 1024 are used for ease of understanding that thus it is ensured that the MCC/MNC has no influence on the mod 1024 calculation of UE_ID. Thus, 01024 encodes an increased collision probability of 0.5%, 02048 an increased collision probability of 1% and so on.

Likewise the number of MTC devices in the group is also encoded as multiples of 1024, and 1000 MTC devices is encoded as 01024, 2000 MTC devices as 02048 and so on. Then, to the encoded number of MTC devices the group specific constant is added, which is to be the UE_ID. For instance, in case of 100 MTC devices 123 is added to 01024, arriving at 01147 for the first five positions. Due to encoding of the collision probability, the number of MTC devices as multiples of 1024 the mod 1024 calculates invariably yields the group specific constant as UE_ID.

With the above encoding scheme the relationship between the actual and the encoded parameter can be derived easily, however, the number of possible parameters that can be notified is quite limited due to the large number of 1024 as basis for the individual encoding of the parameters. If instead of using all possible multiple of 1024, for instance multiples of 32 are used for encoding the encoded collision probability, far more different collision probabilities could be encoded.

This however does not apply to the encoded number of MTC device, since being the first five positions of the pseudo IMSI they have a direct impact on the result of the modulo operation. In other words, the encoding of the number of MTC devices in the group should be done by a multiple of the number used for the modulo operation which in this case is 1024.

A similar scheme may be used when encoding other parameters, such as the maximum delay time. Furthermore, when using the pseudo S-TMSI instead of the pseudo IMSI, the above consideration do not apply, since the pseudo S-TMSI is not used to determine the UE_ID and thus the paging occasion.

Figure 5:
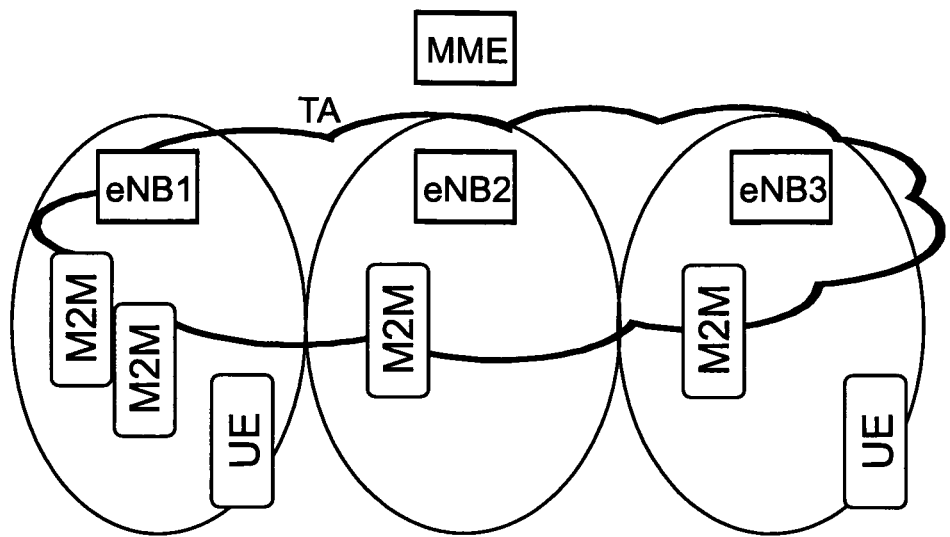
FIG. 5 illustrates the network deployment for an exemplary scenario where a low number of MTC devices are deployment in a network, thus not needing a peak avoidance mechanism.

One example how the dynamic peak avoidance mechanism works on a high level with pseudo IMSIs from the table above is shown in connection with the following figures:

In FIG. 5 a utility company may deploy a couple of MTC devices for gas metering in a specific area. All devices are in a specific group and a group ID (e.g. 123) is assigned and notified to the devices during the attach procedure. The number of MTC devices is still low; thus there is no need for any specific peak avoidance control. For instance, only four MTC devices are depicted in the network of the MME, two in the cell of eNB1 and respectively one MTC device in the cell of eNB2 and eNB3. It is assumed that each depicted MTC device actually corresponds to 300 MTC devices in the system. Therefore, in the scenario of FIG. 5 there are 1200 MTC devices deployed in total.

Figure 6:
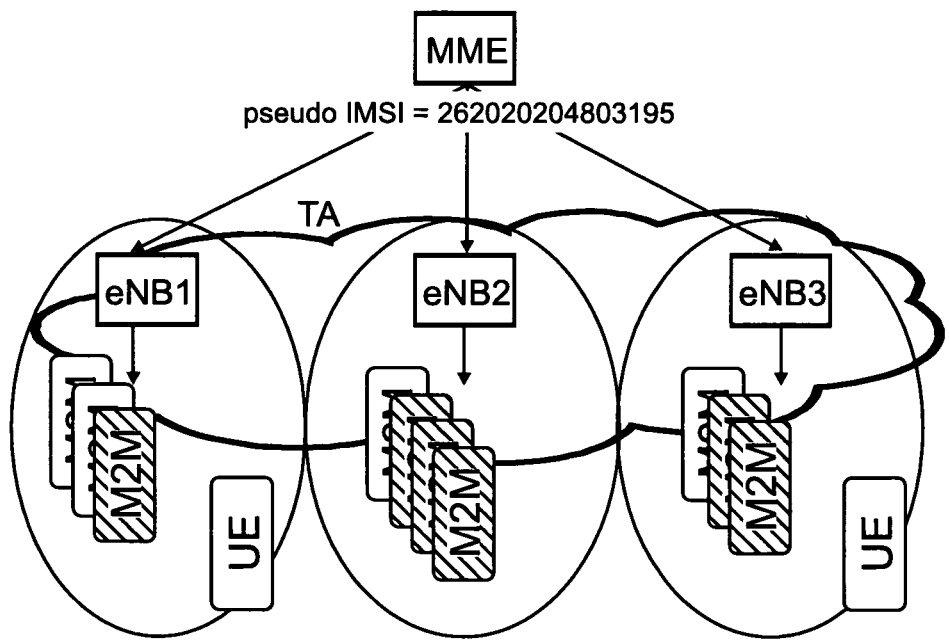
FIG. 6 illustrates the network deployment of the scenario of FIG. 5 where the number of MTC devices increases above a threshold so that peak avoidance is applied and configured.

As illustrate by FIG. 6, the utility company increases the number of MTC devices for gas metering to 3000 in total for the MME network (10 MTC devices are depicted). The number of MTC devices gets higher than a threshold (for instance, the threshold is 2100 MTC devices) so that overload in the radio access or network may cause an overload situation. The newly attached MTC devices are depicted hatched in FIG. 6. and are informed during attach about the increased collision probability of 1% for MTC devices and number of MTC devices=3000, and the IDLE or DETACHED MTC devices are informed for example via paging using a pseudo IMSI generated by the scheme of the above table. In this case, the pseudo IMSI is 26202204803195 assuming that the MME network is a Vodafone Germany network. The MTC devices thus are informed about the necessary information to calculate their own delay time when a trigger event triggers the connection to the RACH to achieve uplink synchronization.

Figures 7, 8:
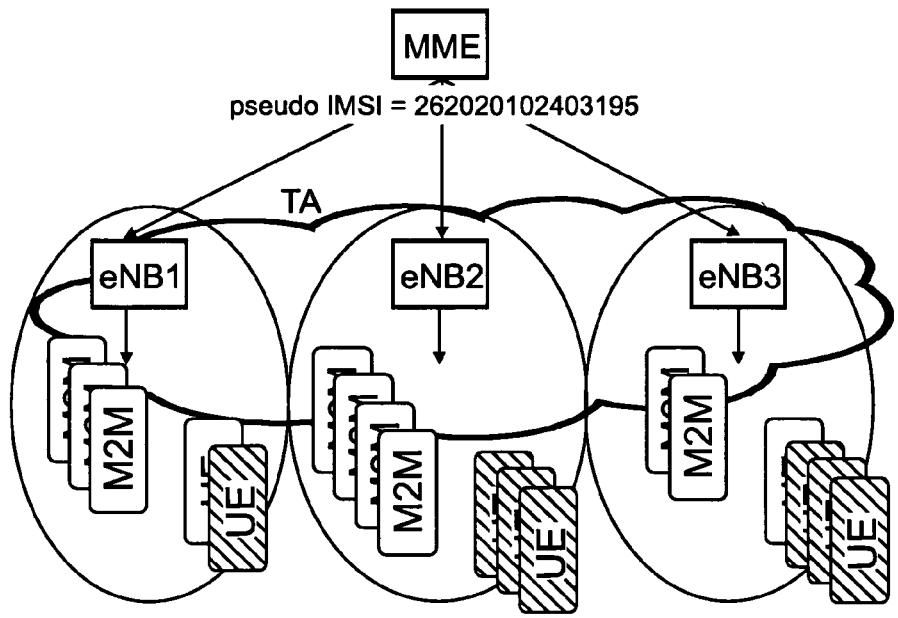
FIG. 7 illustrates the network deployment of the scenario of FIG. 6 where the number of UEs increase thus changing the load in the network, and necessitating a configuration update for the MTC devices.
FIG. 8 illustrates an exemplary format of a pseudo IMSI according to an embodiment of the invention.

Then, in FIG. 7, the number of normal UEs in the Tracking Area of the network increases, and thus, also the possibility of collisions increases for the UEs, while the number of MTC devices and the collision probability for the MTC devices remains the same. It is assumed that the collision probability for the UE devices increases by 0.5%, which leads to that the collision probability for the MTC devices decreases by the same amount to 0.5% instead of 1%. Therefore, the MME informs the MTC devices about a new increased collision probability of only 0.5% and the unchanging number of Devices=3000 via paging. Correspondingly, a new pseudo IMSI is generated using the above table, which yields the pseudo IMSI=26202012403195. The MTC devices of the group will read the paging and adapt their connection behaviour in case of a potential peak.

One problem with the above scheme for generating the pseudo IMSI is that in case the pseudo IMSI is composed of a MCC and MNC belonging to the appropriate mobile network operator (or to a roaming partner), a clash with a normal IMSI might happen. For instance, in the above table the pseudo IMSI is generated using the actual MCC and MNC used for Vodafone Germany or for NTT DoCoMo Japan. In case the MTC devices are notified about new parameters with the pseudo IMSI, also a UE with the corresponding IMSI will determine that it is paged and will attach to the network. On the other hand, if a UE is actually paged with the IMSI, also MTC devices that have a possible pseudo IMSI that corresponds to the IMSI of the UE will determine that a change of the parameters has happened and they will adopt the new parameters.

In order to avoid such a clash between a possible pseudo IMSI and an IMSI of a normal UE, specific MCC (and/or MNC) values can be used for the MTC devices, instead of the MCC and MNC of the mobile network operator (or a roaming partner of said network operator). The MCC, MNC values used are either not (yet) allocated MCC, MNC values or those of a network operator that does not have roaming agreements with the current network operator or those that are not used in the area of the current MME. The MCC value can be the same for all MTC devices. Alternatively, different MCC values can be used by different groups. If the MCC value is the same for all MTC devices, the maximal number of groups is 1024, identified by the group specific constant. However, if different MCC values are also used for encoding the different groups, the number of possible groups increases by 1024 per additional MCC value.

With the scheme of using different MCC values for MTC devices and using the 12 digits of MNC+MSIN for the notification of the new parameters, almost $10^9$ values can be represented as parameters (12 digits=max 999.999.999.999=$10^{12}$ and $10^{12}/1024$=ca. $10^9$).

Such a pseudo IMSI is depicted in FIG. 8, where the MCC is specific for the configuration of the connection establishment and the remaining digits encode the configuration parameters and the group ID.

Moreover, one issue with using the pseudo IMSI and the relation to a group is that the group ID may be only valid in a specific area or at a specific time. I.e. in the area of another MME a different group ID may be used for the same group. Or at another time, groups may be assigned to another group ID, for example if different groups can be combined when peak behaviour is similar during specific time intervals. This may lead to the problem that, when MTC devices move to another area, the group identifier does no longer apply and they are not configured properly for their group.

According to another embodiment of the invention, the MTC devices are updated during a TAU (Tracking Area Update) due to mobility, so as to solve the above problem. I.e., in case an MTC device of the group is idle and moves to a different MME, it performs a TAU and can be updated with the new group ID during TAU. However, as described previously, the MTC device may be detached but listening to the paging information and is only attaching in case of a specific event. In the same way, a MTC device can be updated during periodic TAU. However, a stationary MTC device may not perform periodic TAU, or the periodic TAU timer may be too high. Thus, the MTC device needs to get aware about a new group ID without TAU.

Therefore, in order to inform the MTC devices without TAU procedure about a change of the group ID, instructions can be encoded (in addition to the configuration parameters) into the paging messages to the MTC devices, and specifically into the pseudo IMSIs. Then, the MTC devices can determine whether a group ID has changed because of movement or time, or whether access behaviour parameters have changed, based on instructions and parameters in combination with the detected location or determined time.

The following describes examples of the pseudo IMSI with encoded instructions:

It is assumed that the first 3 digits (MCC) of the pseudo IMSI are specific to the current group. Then, the remaining 12 digits can represent almost $10^9$ values and are the encoded instructions+parameters. E.g., with the pseudo IMSI=111010240010351 and the group specific constant=pseudo IMSI modulo 1024=111, the instructions+parameter can be derived from (010240010351−111)/1024=0 10000 010. The first digit=0 stands for the instruction "new parameters for expected devices and collision probability", the digits 2-6=expected devices and digits 7-9=difference of collision probability in 0.1% with the pseudo IMSI=234136533572842 and the group specific constant=pseudo IMSI modulo 1024=234, the instructions+parameter can be derived from (136533572842−234)/1024=1 33333 567. The first digit=1 stands for the instruction "change group ID in new TA to new group ID", the digits 2-6=Tracking Area Code (TAC) and digits 7-9=new group ID. The MTC devices are notified about the different group ID while still being in the old Tracking Area. Then, if an MTC Device with group ID 234 discovers in a new area a new TAC 33333, it changes its group ID to 567.

Figure 9:
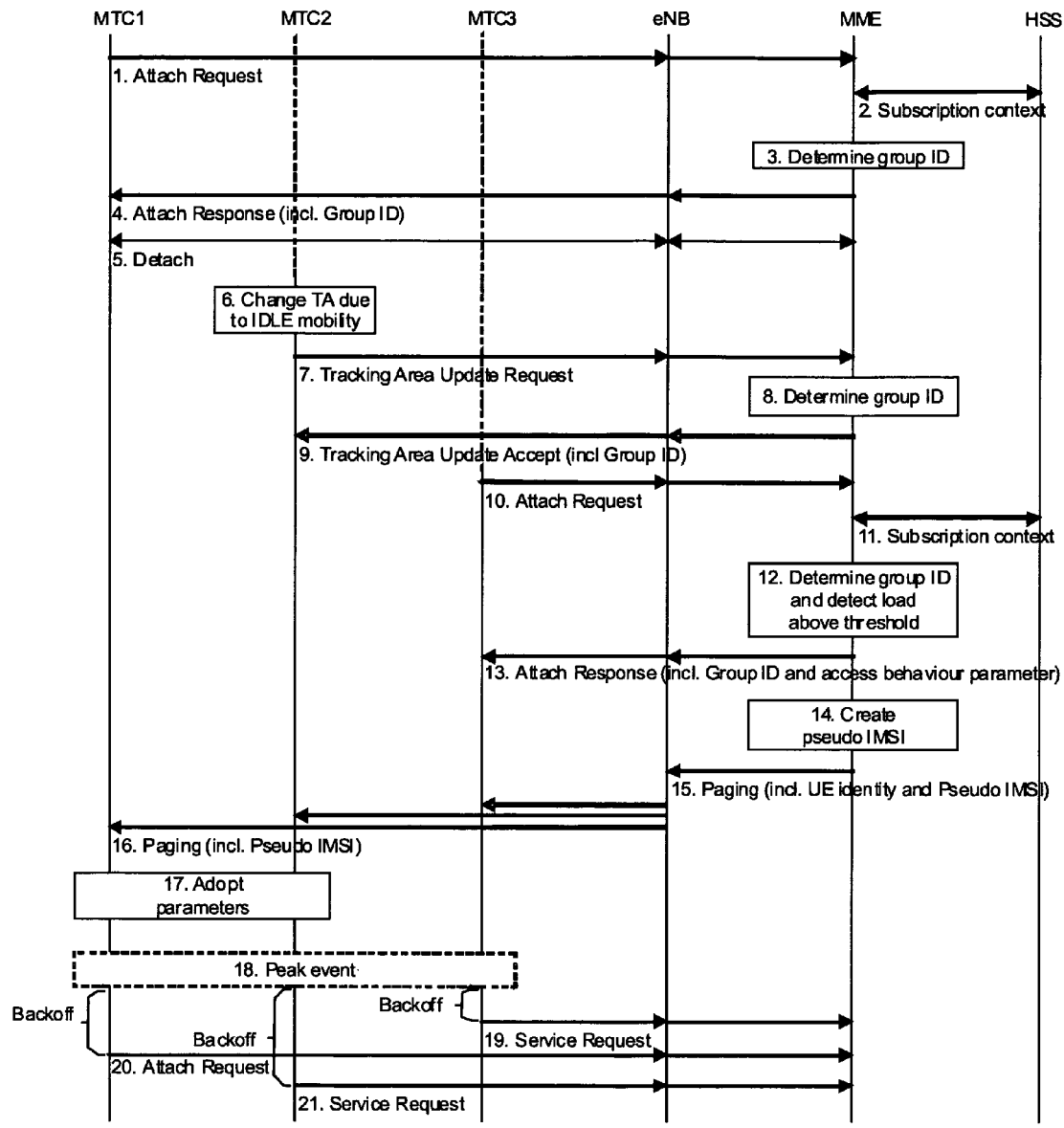
FIG. 9 is a signaling diagram of a simplified scenario in which three MTC devices connect to the network and are configured for using the peak avoidance mechanism.

A signalling flow example is shown in FIG. 9 according to one embodiment of the invention. Here, three MTC devices that are part of the same group, i.e. they establish a connection in case of the same event, are located in the same area (e.g. in the vicinity of the same eNB and MME).

1. The MTC device MTC1 is attaching to the network and sends an Attach Request to the MME via the eNB.
2. The MME requests the subscription context for MTC1 from the HSS.
3. Based on the subscription context and possibly additional information the MME determines the peak behaviour of the device and categorizes MTC1 into the appropriate group. Since the total number of MTC devices of that group in the same area is still low, there is no need for the MME to trigger the MTC devices to use a peak avoidance mechanism.
4. The MME sends the Attach Response to the MTC device MTC1 and includes in the attach message the assigned group ID.
5. MTC1 detaches from the network. The MME keeps the context of the MTC device (e.g. because the MME is aware from the subscription context that MTC1 is a stationary MTC device) and also includes the MTC device in calculations of the load in the network in case of a peak. The MTC device MTC1 continues to monitor the paging channel for new information or parameters related to its accompanying group. MTC1 may calculate the paging occasion based of the group ID received in Step 4, in case the group ID=UE_ID. Alternatively, the UE_ID can be derived from the group ID if the group ID includes also the MCC parts.
6. The MTC device MTC2 is in IDLE state and moves into a new Tracking Area.
7. MTC2 sends a Tracking Area Update Request to the new MME.
8. The MME determines the peak behaviour of the device (for example based on the context received from the old MME) and categorizes MTC2 into the same group as MTC1. The group ID has changed from the previous location of MTC2. Since the total number of MTC devices of that group in the same area is still low, there is no need for the MME to trigger the MTC devices to use a peak avoidance mechanism.
9. The MME sends the Tracking Area Update Accept to the MTC device MTC2 and includes in the attach message the new group ID. After receiving the TAU Accept, MTC2 is sent to IDLE state. MTC2 continues to monitor the paging channel for new information or parameters related to its accompanying group.
10. The MTC device MTC3 is attaching to the network and sends an Attach Request to the MME via the eNB.
11. The MME requests the subscription context for MTC3 from the HSS.
12. Based on the subscription context and possibly additional information the MME determines the peak behaviour of the device and categorizes MTC3 into the same group as MTC1 and MTC2. Since the total number of MTC devices of that group in the same area is now higher than a threshold, there is a need for the MME to trigger the MTC devices to use a peak avoidance mechanism. Therefore, the MME determines the appropriate access behaviour parameter for the group.
13. The MME sends the Attach Response to the MTC device MTC3 and already includes in the attach message the assigned group ID and in addition the access behaviour parameters.
14. The MME creates the pseudo IMSI encoding the group ID and the access behaviour parameters.
15. The MME sends a paging message to the eNB including the appropriate UE_ID and the pseudo IMSI.
16. The eNB sends a paging message with the pseudo IMSI at the paging occasion according to the UE_ID, which is received by all MTC devices.
17. MTC1 and MTC2 accordingly adopt the access behaviour parameters for the group ID from the paging message.
18. A peak event happens that causes MTC1, MTC2 and MTC3 to connect to the network. Due to the peak avoidance mechanism and the appropriate parameters each MTC Device determines its backoff time.
19. MTC3 has the lowest backoff time and performs random access to the RACH at first out of the 3 MTC devices to send a service request to the MME.
20. MTC1's backoff timer expires at second and after expiry MTC1 performs random access in order to send an initial attach (because MTC1 was detached)
21. MTC2 has the highest backoff time out of the 3 MTC devices and performs random access last in order to send a service request to the MME.

Accordingly, a connection peak and congestion can be avoided according to the embodiments of the invention.

For the following discussion it is assumed that the MTC devices are grouped together. In the previous discussion for instance the MTC devices are grouped together based on the device characteristics, such as the conditions that trigger the MTC devices to connect to the network at the same time. MTC devices may be further grouped based on the subscription information (such as based on an MTC User, MTC feature or PLMN) or based on the attached network (such as based on the Access Point Name, APN).

Furthermore, it is assumed that one MTC device can be a member of multiple groups. For example, one MTC device may belong to an MTC group A, B and C. MTC devices of MTC group A may belong to a subscribed MTC User. MTC devices of MTC group B may belong to the attached APN. MTC devices of group C may be subscribed to a particular PLMN (which may or may not be the same PLMN as the PLMN to which the MTC device are currently registered).

In more detail, a corresponding entity in the network responsible for paging, for example the MME, generates and assigns different group identities to the MTC devices depending on the groups to which the MTC devices respectively belong. The MME may acquire information on the groups of an MTC device from an HSS (Home Subscriber Server) server or an AAA (Authorization, Authentication and Accounting) server in the network. For each existing and relevant group a different group ID is generated, which may be selected randomly. For instance, the group ID can have 7 digits, but may have less or more digits as well depending on whether the group ID is used as part of an IMSI or S-TMSI and how many digits are to be used for the parameters, as will be explained later on.

The MTC devices are informed by the MME during their attach procedure to the network or during a Tracking Area Update procedure about the group IDs that are assigned to them. For example, the attach accept message of the attach procedure or the TAU accept message of the TAU procedure, both messages send from the MME to the MTC devices, can contain the group ID assigned to the MTC devices. An MTC device thus learns the group IDs of the groups it belongs to. Another possibility could be that the group IDs, or at least some of them, are already pre-configured in the MTC devices (e.g. in the SIM card, similar to the IMSI) and the MME.

As discussed in the background section with regard to paging, the IMSI or S-TMSI of a UE/MTC device may be used for paging.

FIG. 8 shows the structure of the IMSI and how the IMSI can be used as a pseudo IMSI for encoding the various parameters for the congestion avoidance. Another example of how to generate a pseudo IMSI or pseudo S-TMSI is presented in the following with reference to FIGS. 10 and 11. According to the embodiments in FIGS. 10 and 11, the pseudo IMSI/S-TMSI is composed of a group ID and parameters which are to be transmitted to the MTC devices. For instance, a pseudo IMSI may have 15 digits as the IMSI of the prior art, and the pseudo S-TMSI may have 10 digits as in the prior art. The group ID field may have a length of e.g. 7 digits, which would leave 3 digits of the pseudo S-TMSI for the parameters.

The advantage of using the IMSI format is that the IMSI has more digits than the S-TMSI, and thus allows to distinguish between a greater number of MTC groups. If possible, the pseudo IMSI/S-TMSI, and in particular the group IDs should be generated such that no other UE or MTC device has the same IMSI/S-TMSI.

The following list shows for an exemplary embodiment all the groups to which a single MTC device may belong and the corresponding group paging target identities, in this case pseudo S-TMSIs. The list also includes the pre-configured IMSI (e.g. from the SIM card) of the MTC device.

IMSI
    ps S-TMSI-All=group ID(All)+parameter
    ps S-TMSI-GrA=group ID(GrA)+parameter
    ps S-TMSI-GrB=group ID(GrB)+parameter
    ps S-TMSI-APN1=group ID(APN1)+parameter
    ps S-TMSI-PLMN1=group ID(PLMN1)+parameter The group "All" refers to all MTC devices registered in the network; group A, "GrA" refers to all MTC devices belonging to User A. MTC devices may also belong to group B, "GrB", which associates all MTC devices subscribed to a "time controlled" feature. Further, a group ID, "APN1", refers to all MTC devices that are connected to the same access point, APN1. Yet a further group may be formed based on the PLMN, to which the MTC devices belong. Thus, the particular exemplary MTC device belongs to five different groups at the same time.

One problem caused by assigning multiple group IDs and the resulting group pseudo IMSIs to an MTC device is that the MTC device needs to monitor multiple paging occurrences, i.e. multiple paging frames and paging occasions, if the MTC device calculates a separate paging occurrence per pseudo IMSI. The MTC devices could use the "group ID mod 1024" operation to calculate the corresponding group UE_ID (compare with paging of prior art), which is then used for determining the paging frame and paging occasion.

This would result in increased consumption of resources in the MTC device because each time a paging frame and paging occasion monitored by the MTC device is paged (i.e. the P-RNTI, Paging radio network temporary identifier, is included in the paging occurrence), the MTC device will read and decode the corresponding paging message from the PDSCH (Physical Downlink Shared Channel).

According to a first aspect, this problem is avoided by configuring the MTC devices to listen only to one of the several group paging occurrences. Correspondingly, the calculation of the group paging occurrence can be based on one of the assigned group IDs. The MME and the MTC device may negotiate during the attach or TAU procedure which one of the group IDs is to be used to calculate the paging occurrence for the MTC devices of the group. Then, the MTC device only monitors the paging occurrence calculated based on the agreed group ID. The MME when transmitting a paging message to the eNBs, includes the value of (agreed group ID mod 1024) into the UE_ID index value field and further includes the pseudo IMSI/S-TMSI (containing the group ID of the group which MTC devices are to be paged) into the UE paging identity field. The eNB(s) which receive the paging message from the MME can calculate the paging frame and paging occasion (subframe) based on the group ID in the UE_ID index value field, and broadcasts a paging message including the pseudo IMSI/S-TMSI encoding the group ID from the UE paging identity field at the corresponding resources of the PDSCH.

Figures 10, 11, 12:
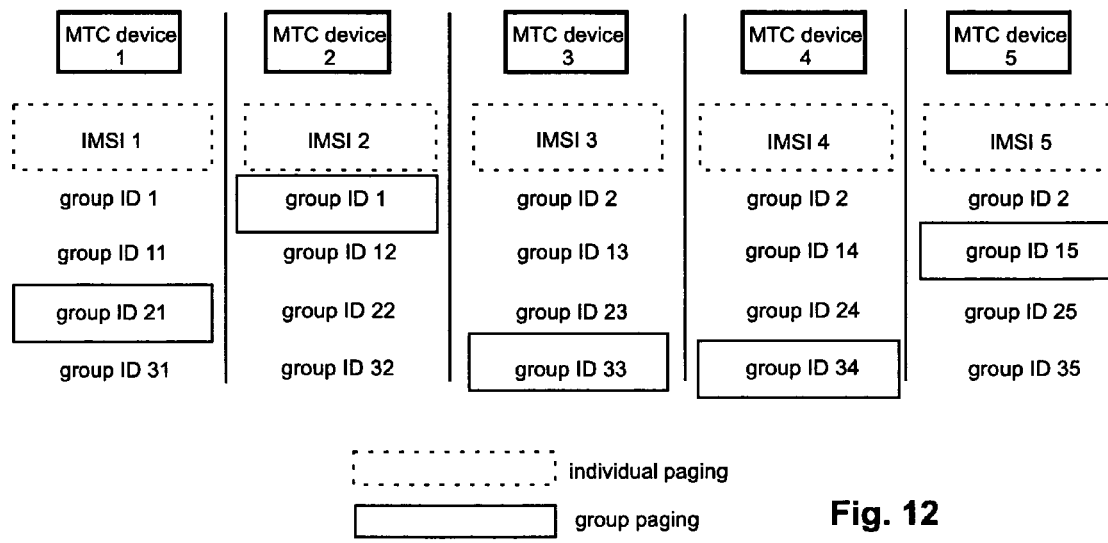
FIG. 10 illustrates the format of a pseudo IMSI, comprising the group ID and optionally parameters according to one embodiment of the invention.
FIG. 11 illustrates the format of a pseudo S-TMSI, comprising the group ID and optionally parameters according to another embodiment of the invention, FIG. 12 gives an overview of five MTC devices and the different group IDs assigned to the MTC devices, and in addition shows which group IDs or IMSIs are used for individual and group paging according to an embodiment of the invention, FIG. 13 gives another overview of five MTC devices and the different group IDs assigned to the MTC devices, however illustrates the use of a specific GrMTC_ID for the group paging according to another embodiment of the invention.

FIG. 12 gives an exemplary overview of the group IDs assigned to five MTC devices and the resulting paging. For instance, MTC device 1 belongs to groups 1, 11, 21 and 31, and correspondingly has been assigned the group IDs 1, 11, 21 and 31, apart from its own IMSI1. For the example presented in FIG. 12 it is assumed that an MTC device listens to two paging occurrences, one when being paged individually and one when being paged as a member of a group For the individual paging, i.e. if only one MTC device is to be paged, the MME includes the UE_ID value, calculated based on the value of (IMSI1 mod 1024), in the UE_ID index value field of the paging message and includes the IMSI1 in the UE Paging Identity field of the paging message transmitted to the eNB. The eNB correspondingly uses the UE_ID in the received paging message to calculate the paging occurrence, and transmits the paging message including the IMSI1 in the UE paging identity field. The MTC device listens to the paging occurrence corresponding to its IMSI (IMSI mod 1024=UE_ID), and thus receives the paging message.

For the group paging, i.e. if all MTC devices of a particular group are to be paged, the MME uses the group ID, which was agreed upon by the MME and the MTC device to be the group ID used for calculating the paging occurrence. The MME generates a paging message having the value of (the agreed group ID mod 1024) in the UE_ID index value field, and the pseudo IMSI/S-TMSI (based on the group ID of the group which is to be paged) in the UE paging identity field (may be a different group ID than the agreed group ID in the UE_ID index value field). For example, for the MTC device 1 the group paging is based on the agreed group ID 21, while the individual paging is based on the IMSI1. For MTC device 2 the group paging is based on group ID 1 and the individual paging is based on IMSI2.

Alternatively, the individual paging may also be based on the group IDs instead of the IMSIs. In said case, the MTC device would only have to listen to one paging occurrence instead of two different paging occurrences. The MME will send paging messages, having the agreed group ID in the UE_ID index value field and either the IMSI of the MTC device or the group ID of the group that is to be paged in the UE paging identity field.

Another embodiment of the invention solves the problem differently in that an explicit group ID (denoted GrMTC_ID) is determined and assigned to the MTC devices as will be explained in the following. This explicit group IDs are only used to calculate the paging frame and paging occasion for members of a particular group. The group IDs identify the groups and are used within the UE paging identity field of the paging messages. In other words, instead of assigning one of the already present group IDs, a pre-configured group ID, the GrMTC_ID, is used in said respect.

An explicit group ID for paging (GrMTC_ID) is generated for each group defined in the network by the MME or any other appropriate entity in the network. The GrMTC_ID may be selected from the range of [0, 1 . . . 1023], similar to the UE_ID in the prior art paging which is calculated by (IMSI mod 1024). Advantageously, the GrMTC_IDs should be evenly selected from the above indicated range, such that the MTC devices when being paged with the original paging meaning (i.e. wake up) using the GrMTC_ID do not all wake up at basically the same time and thus cause a congestion.

The MME may learn or has already stored the GrMTC_ID for a particular MTC group from the HSS (if available) or may generate a new GrMTC_ID (if not available in the subscription information, i.e. HSS) The MME may then accordingly perform the assigning of the GrMTC_ID to the MTC device during the attach or TAU procedure. It would be possible to assign the GrMTC_IDs of all groups to which a particular MTC device belongs to the MTC device. Then, the MTC devices of a group could be easily paged by generating a paging message in the MME, comprising the GrMTC_ID of the group which is to be paged in the UE_ID index value field and the corresponding group ID in the UE paging identity field, The paging message is transmitted from the MME to the eNB and from there broadcast at channel resources according to the GrMTC_ID in the received paging message. All MTC devices belonging to said group would listen at the appropriate timing and resources of the PDSCH channel and get the paging message. Based on the enclosed group ID they would realize that the paging message is addressed to them and would thus wake up.

In said case however, the MTC devices would have to monitor various paging occurrences, i.e. one paging occurrence per GrMTC_ID. In order to avoid this, it is assumed for the following that to a particular MTC device is assigned only one GrMTC_ID of the various groups of the MTC device.

Further, during the attach procedure (or TAU) each MTC device is assigned with group IDs (used as group paging target identity) identifying all the groups it belongs to for later use in paging. Then, each MTC device knows to which groups it belongs and the MTC device also knows when (i.e. which resources) to monitor, based on the GrMTC_ID (as group paging resource indication) which is used to calculate the paging occurrence.

Figure 13:
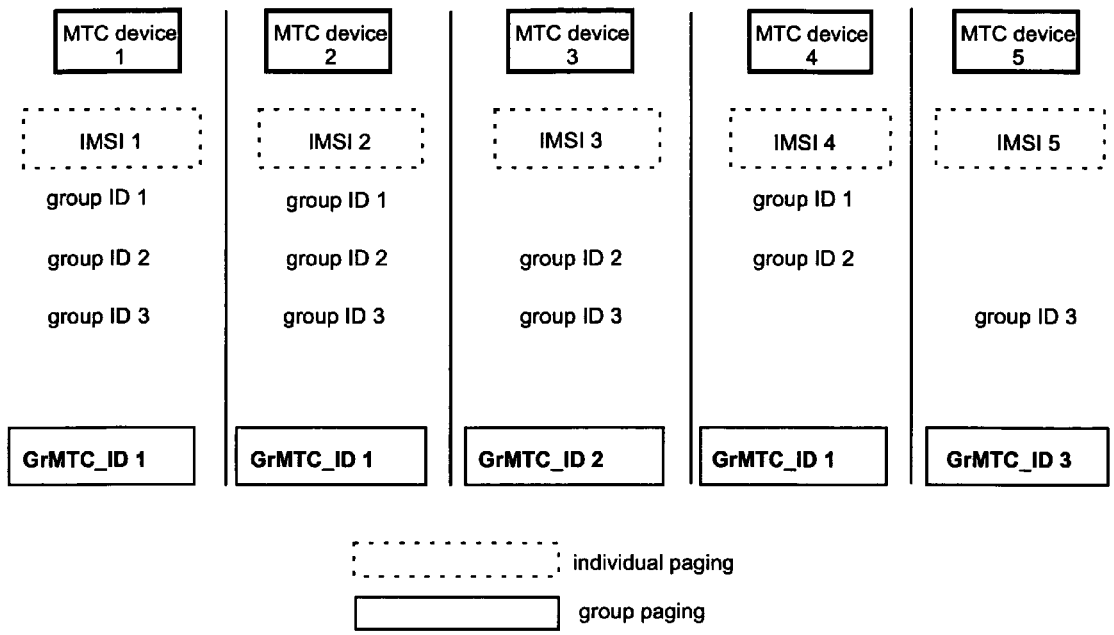

FIG. 13 gives an overview of the group IDs and assigned GrMTC_IDs of five exemplary MTC devices. MTC device 1 is assumed to belong to groups 1, 2 and 3; MTC device 2 belongs to groups 1, 2 and 3 too; MTC device 3 belongs to groups 2 and 3; MTC device 4 belongs to groups 1 and 2, and MTC device 5 only belongs to group 3.

As apparent from FIG. 13, the MME has assigned GrMTC_ID1 to MTC devices 1, 2 and 4; has assigned GrMTC_ID2 to MTC device 3 and has assigned GrMTC_ID3 to MTC device 5.

It is assumed that the devices of a particular group shall transfer from IDLE to CONNECTED state so as to trigger them to establish RRC connections to the network. The MME first wants to page the MTC devices of group 1, which are MTC devices 1, 2 and 4. Therefore, the MME generates a paging message having a pseudo IMSI/S-TMSI (containing the group ID 1) in the UE paging identity field and having the GrMTC_ID1 in the UE_ID index value field. As apparent, all MTC devices of the group 1 listen to the paging occurrence calculated based on GrMTC_ID1, and thus will receive the paging message broadcast by the eNB at the resources of the PDSCH, calculated by the eNB based on the GrMTC_ID1 received in the paging message from the MME. The paging message broadcast by the eNB includes the pseudo IMSI/S-TMSI containing the group ID1, and thus the MTC devices 1, 2 and 4, ascertain that the paging message is addressed to them. Accordingly, they will transfer from the IDLE state to the CONNECTED state.

In order to page the three MTC devices of group 1 with the paging mechanism known from the prior art, it would have been necessary to transmit three separate paging messages from the MME, respectively including their IMSIs (of the MTC devices 1, 2 and 4) and the corresponding UE_IDs (calculated based on the IMSIs) in the paging messages. Therefore, by using the group paging mechanism according to the embodiment of the invention it is possible to save resources since only one paging message is transmitted.

Now, the MTC devices of group 2 are to be paged, i.e. MTC devices 1, 2, 3 and 4. As can be appreciated from FIG. 13, the MTC devices listen to two different paging occurrences, namely to one based on GrMTC_ID1 (MTC devices 1, 2, 4) and the other based on GrMTC_ID2 (MTC device 3). Therefore, the MME will send two paging messages. One of the paging messages will include the GrMTC_ID1 in the UE_ID index value field and the other paging message will include the GrMTC_ID2 in the UE_ID index value field. Both paging messages include a pseudo IMSI/S-TMSI containing the group ID2 in the UE paging identity field. The eNB(s) receive both messages and correspondingly will calculate the paging resources in the PDCCH to broadcast two paging messages in the PDSCH both including the group ID2 in the UE paging identity field.

MTC devices 1, 2 and 4 listen to the paging occurrence based on GrMTC_ID1 and read the corresponding paging message including the pseudo IMSI/S-TMSI containing the group ID2. MTC device 3 listens to the paging occurrence based on GrMTC_ID2 and reads the corresponding paging message with the pseudo IMSI/S-TMSI containing the group ID2. The MTC devices 1, 2, 3 and 4 match the group ID2 within the pseudo IMSI/S-TMSI of the paging message with the group ID2 they have been assigned, and thus will transfer from IDLE to CONNECTED state.

Though two paging messages are transmitted for paging one group, compared to the prior art individual paging based on the IMSIs, which would have transmitted four paging messages in total, the group paging according to the embodiment of the invention still saves resources in the core network and over the radio interface.

The MME will send three different paging messages in order to page all MTC devices of group 3, i.e. the MTC devices 1, 2, 3 and 5 which listen to three different paging occurrences, i.e. namely MTC devices 1 and 2 listen to the paging occurrence calculated based on GrMTC_ID 1, while MTC device 3 listens to the paging occurrence calculated based on GrMTC_ID 2 and MTC device 5 listens to the paging occurrence calculated based on GrMTC_ID3. Correspondingly, the MME generates three paging messages all including a pseudo IMSI/S-TSMI with the group ID3 in the UE paging identity field but respectively including the GrMTC_IDs 1, 2 and 3 in the UE_ID index value field. The eNB receives the three paging messages and broadcasts three paging messages with the group ID3 but at different channel frames/subframes according to the GrMTC_IDs.

The paging message transmitted at the paging occurrence associated with GrMTC_ID1 will be received by MTC devices 1, 2 and 4, which listen to the corresponding paging frame/subframe. However, MTC device 4 does not belong to group 3 and thus ignores the paging message which is only addressed to group 3, i.e. includes a group ID 3 which the MTC device 4 is not assigned to. The MTC devices 1, 2, 3 and 5 listen at different resources of the PDSCH but all receive the same paging message addressed to group 3. Correspondingly, the MTC devices 1, 2, 3 and 5 will transfer from IDLE to CONNECTED state.

Again, resources are saved compared to the paging mechanism of the prior art which would have transmitted four paging messages for the four members of the three groups.

The advantage of having to transmit less paging messages attained by performing the group paging of the present invention naturally becomes greater with the number of MTC devices which belong to the groups.

In general, the MME has information about all UEs and the corresponding group paging target IDs and GrMTC_IDs. Therefore, the MME may then determine how many paging messages are to be sent in order to reach all MTC devices of a particular group. This basically depends on how many different paging occurrences are used by the MTC devices of said particular group.

In the exemplary embodiment illustrated in FIG. 13 the group paging is based on the paging occurrences calculated based on the fixed GrMTC_IDs, whereas the individual paging is based on the paging occurrences calculated based on the IMSIs of the MTC devices. Similar to the prior art, when the MME wants to page only one MTC, it generates a paging message including the UE_ID (=IMSI mod 1024) into the UE_ID index value field and the IMSI in to the UE paging identity field of the paging message. The paging message is transmitted to the eNB, and then broadcast by the eNB over the radio interface. However, the disadvantage is that the MTC devices have to monitor two paging occurrences, and thus the resource (e.g. battery) consumption in the MTC devices is increased.

According to an alternate embodiment of the invention, the GrMTC_IDs can be used for individual and group paging. In case of individual paging, the IMSI of the particular MTC device is included by the MME into the UE paging identity field of the paging message, and in case of group paging the group target ID of the relevant group is included into the UE paging identity field of the paging message. In both cases the assigned GrMTC_ID is included in the UE_ID index value field. Using the GrMTC_IDs for the individual as well as for the group paging has the advantage that the MTC devices have to monitor only one paging occurrence instead of two paging occurrences, which saves power in the MTC device.

The MME shall store an association between the MTC device (e.g. the IMSI), the groups of the MTC device and the GrMTC_ID for each MTC device. The MME is thus able to generate the paging message when particular MTC devices are to be paged.

Generally, the paging message contains only one value in the UE_ID index value field (e.g. GrMTC_ID) and one value in the UE paging identity field (e.g. IMSI or pseudo IMSI/S-TMSI with group ID). According to the invention, one paging message however is able to address multiple MTC devices.

In the previous embodiments of the invention, the paging message is used to page a group of MTC devices or particular MTC devices, i.e. to wake them up so that the MTC devices transfer from IDLE state to the CONNECTED state. However, similar to previous embodiments the paging message may also be used to provide particular configuration parameters to MTC devices of a group. The parameters are encoded into the pseudo IMSIs/S-TMSIs generated for each MTC group, as already explained in connection with FIGS. 10 and 11.

In general, the parameter encoded within the pseudo IMSI/S-TMSI may relate to any configuration which shall be adapted in the MTC devices of a particular group. In case of access restriction, the parameter encoded within the pseudo IMSI/S-TMSI may refer to a backoff time, e.g. for informing the MTC devices that they are to postpone the sending of any signalling to the network by a randomly selected value within the range given by the backoff time. The backoff time may also be used as a minimum time the MTC devices have wait before sending any signalling after being paged.

In the exemplary embodiment where the parameter is encoded with three digits, the first digit may encode the time format, i.e. seconds, minutes or hours. The second and third digits then would encode the values in the range of [00, 01, 02 . . . 60] or [00, 01, 02 . . . 99]. As an example, the value of the first digit is encoded to be "1" for second, "2" for minutes and "3" for hours. Then, a backoff time value of "145" means 45 seconds, and a backoff time value of 220 means 20 minutes.

Of course, using as parameter a backoff time is merely an example, and a skilled person may encode any suitable parameter which is to be configured in the MTC devices as he sees fit. For instance in correspondence with previous embodiments, the parameter may indicate increased collision probabilities and/or number of devices. For example the parameter's digits may encode a probability value (also called restriction factor) for sending data/signalling to the network. If the restriction factor is e.g. 0.9, the MTC device is allowed to send only 10% of its data/signalling which it would like to send without applying the restriction. This restriction factor may be also applied in a way as the so called "baring factor" used in the access class baring function described in 3GPP TS36.331.

In general, in order to avoid congestion when a great number of MTC devices start signalling to the network, the parameters should indicate an access restriction like the mentioned backoff time. Other access restriction parameters may be a maximum number of bearers, connections per APN or a restricted uplink data rate.

Furthermore, the parameter may not only comprise 3 digits but may be composed of more digits, thus allowing to encode more or more detailed parameters.

In more detail, if the pseudo IMSI or pseudo S-TMSI of FIG. 10 or 11 are used in the paging message's UE paging identity field, the MTC devices receiving said paging messages shall not immediately transfer from IDLE state to CONNECTED state, but shall adopt the parameters encoded in the pseudo IMSI/S-TMSI instead.

In order to distinguish between the wake-up functionality and the parameter configuration, the pseudo IMSI/S-TMSI can be set up in a special way, so that the MTC devices may determine whether they should wake up or adopt the encoded parameter(s). For instance, the backoff time can be set to zero (i.e. the second and third digits of the parameter values are set up to "0"), in case the MTC device of the group shall wake up. If the backoff time has a non-zero value, the MTC devices will merely adopt the non-zero parameter without changing to CONNECTED state. Thus, the group ID in the pseudo IMSI/S-TMSI is the same for both cases, but the parameter settings are different.

Put generally, the configuration of the parameters part of the pseudo IMSI/S-TMSI informs the MTC devices about the required action: whether to perform group paging or to adopt the parameter.

Alternatively, a different unique pseudo IMSI or pseudo S-TMSI (a different unique group ID) may be used for group paging, compared to the group ID used for parameter encoding. In more detail, two different group IDs could be specified per group. A first one is used when all MTC devices of the corresponding group are to wake up and transfer to CONNECTED state. The MTC device when reading the paging message and checking the group ID in the UE paging identity field of the paging message against its own group identities, will infer that it is requested to wake up. On the other hand, if the group ID refers to the parameter configuration, the MTC device will learn this by matching the group ID against the internally stored group IDs, and then, instead of waking up the MTC device will adopt the parameter(s) which are encoded in the pseudo IMSI/S-TMSI.

If there are many MTC groups that shall be paged at once, the MME must send a paging message for each MTC group, which may result in a lot of traffic between the MME and the MTC devices. Each paging message received at the eNB from the MME results in at least one paging message over the radio interface (Uu). In addition, usually the eNB re-transmits the paging messages over the radio interface to make sure the UEs (MTC devices) indeed receive the paging, since no Ack/Nack mechanism is available in the paging procedure. Thus, the number of paging messages over the radio interface is several times higher than the number of paging messages in the core network between the MME and the eNB(s).

Figure 14:
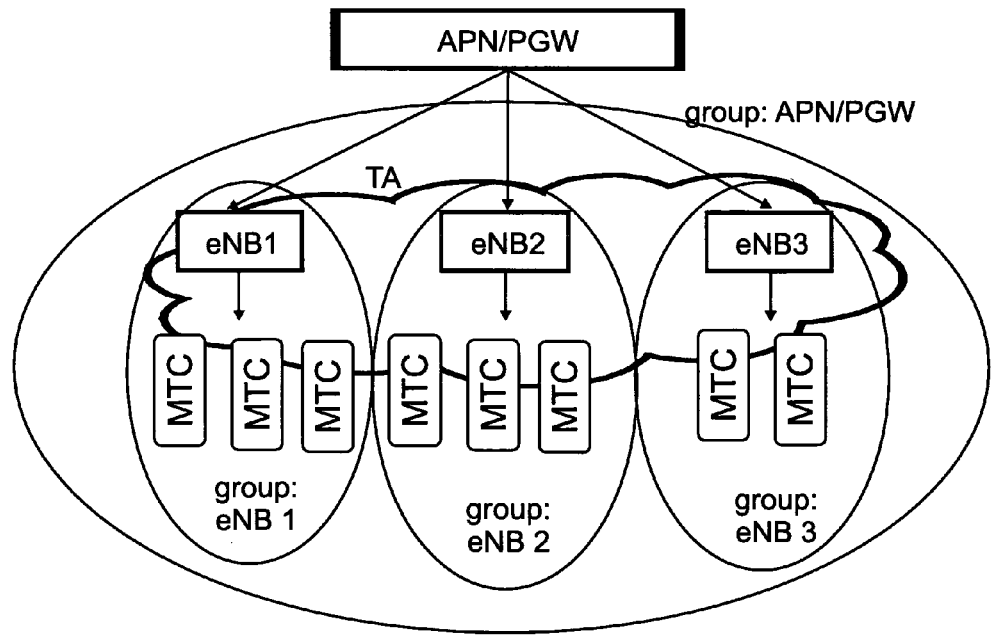
FIG. 14 shows a network deployment for various MTC devices connected to three eNBs, which are all connected to one access point.

FIG. 14 discloses an exemplary network deployment and the resulting exemplary groups that may be formed. It is assumed that several MTC devices are connected to three different eNBs 1-3, which are all attached to the same access point having an access point name (APN) or to the same packet data network gateway (PGW). Correspondingly, three separate eNB groups can be defined and an APN/PGW group, which comprises all MTC devices of the three groups. The APN/PGW group can thus be regarded as a group with a higher level criteria. The higher level criterion for grouping MTC groups can be e.g. the same APN or PGW to which the MTC groups are attached, or the same PLMN to which the MTC groups belong, or the same MTC feature, or any other appropriate criterion.

The deployment of FIG. 14 is only exemplary and of reduced complexity for illustration purposes.

In the exemplary embodiment of FIG. 14, it is possible to separately page the MTC devices of each eNB group or simply all MTC devices attached to the APN/PGW. The MME holds group IDs for eNBs 1-3 and a group ID for the APN/PGW group. Furthermore, according to previous embodiments, the MME also stores a GrMTC_ID for every group, i.e. for eNB groups 1-3 and for the APN/PGW group.

It is assumed that the MTC devices connected to eNB 1 are assigned the GrMTC_ID_e1, the MTC devices connected to eNB 2 are assigned the GrMTC_ID_e2 and the MTC devices connected to eNB 3 are assigned the GrMTC_ID_e3. Thus, in order to page all three groups at once, it would be necessary to send three different paging messages by the MME respectively comprising the group IDs in the UE paging identity fields and the GrMTC_IDs in the UE_ID index value field of the paging messages.

Alternatively, if the GrMTC_ID_APN is assigned to all MTC devices of the three groups, then only one paging message is to be transmitted by the MME, including the GrMTC_ID_APN in the UE_ID index value field and the group ID APN (e.g. within the pseudo IMSI/S-TMSI) in the UE paging identity field of the paging message. Since all MTC devices listen to the same paging occurrence, calculated based on the GrMTC_ID_APN, all MTC devices receive the paging message, and thus wake up or adopt the parameters. Therefore, instead of transmitting three paging messages only one paging message is transmitted from the MME and the eNB, thereby reaching all MTC devices.

In another example, if 1000 MTC groups are attached to 50 APNs, and the network would like to restrict all MTC devices, i.e. all MTC groups, the MME needs to send only 50 paging messages to each eNB instead of 1000 paging messages. Then, taking into account the multiplication of the paging messages on the radio interface due to re-transmissions, a considerable paging burden can be saved. Another advantage is the simple implementation of this hierarchical grouping.

The disadvantage of having all MTC devices listening to the same paging occurrence is that all MTC devices would start signalling with the network at the same time, when paged, which is a problem especially with a high number of MTC devices. Also, is access restriction is applied to the MTC devices with a backoff time, they would all start the signalling after the backoff time expires, so again a congestion may occur. It would thus be advantageous to evenly distribute the paging occurrences and still reduce the number of paging messages that are to be transmitted by the MME.

A further alternative embodiment of the invention solves this object by exploiting the re-transmission mechanism in the eNB with regard to paging messages. As already explained before, the eNB implements a re-transmission mechanism for re-transmitting the same paging message over the radio interface several times to make sure the MTC devices receive the paging. The timing of the re-transmission by the eNB is aligned to the paging frame and paging occasion to which the MTC devices listen. In other words, the re-transmissions by the eNB are performed periodically in accordance with the DRX cycle used by the MTC devices to listen for paging messages.

As explained in the background section, the DRX cycle, also called paging cycle, represents the time interval between monitoring paging occasions for a specific UE or MTC device. Usually the paging cycle is the same for the MTC devices and the eNB, so that the transmission and reception of the paging messages are synchronized.

According to an embodiment of the invention, in order to page the MTC devices of eNB groups 1, 2 and 3, the paging occurrences of the three groups should be determined in such a way that the first transmission of the paging message is received e.g. by the MTC devices of eNB group 1, that the first re-transmission (second transmission) of the paging message is received by the MTC devices of eNB group 2 and that the second re-transmission (third transmission of paging message in total) of the paging message is received by the MTC devices of eNB group 3. Put more generally, the paging occurrences of all groups may be determined in such a way that some of the groups receive the re-transmissions of the paging message.

In more detail, for the following exemplary illustration of the embodiment of the invention, it is assumed that the three eNB groups of MTC devices are respectively assigned the GrMTC_ID_e1, e2 and e3. The GrMTC_ID_e1 is set as an example to 100 which corresponds for illustration purposes to paging frame number 100. The GrMTC_ID_e2 is set to 164, and GrMTC_ID_e3 is set to 228.

Furthermore, the DRX cycle for the eNB, i.e. the DRX cycle transmitted within the paging message from the MME is set to 64, wherein the DRX cycle for the MTC devices has been previously configured to be 192, i.e. 3×64.

Correspondingly, the MTC devices of eNB group 1 (denoted in FIG. 15, 16 as MTCgr1) listen to paging frames 100, 292, 484 and so on in periodical intervals of 192, which is the paging cycle of the MTC devices of eNB group 1. The MTC devices of eNB group 2 (denoted as MTCgr2) listen to paging frames 164, 356, 548 and so on; again in intervals of the paging cycle. The MTC devices of eNB group 3 (denoted as MTCgr3) listen to paging frames 228, 420, 612 and so on. As apparent, the MTC devices calculate the periodical paging occurrences based and the same DRX cycle of 192 and respectively based on the different GrMTC_IDs.

Figure 15:
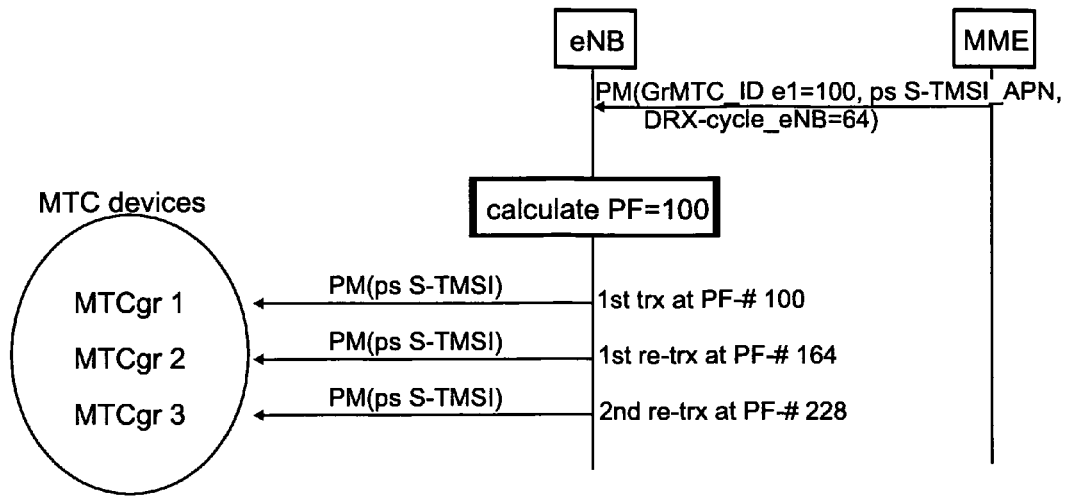
FIGS. 15 and 16 illustrate another embodiment of the invention, in which the paging occurrences assigned to different groups are determined such that the re-transmissions done by the eNB are respectively received by one of the MTC groups.

In order to page the MTC devices of the three eNB groups, the MME generates a message including the group ID APN (e.g. within the pseudo S-TMSI as illustrated in FIG. 15) in the UE paging identity field and the GrMTC_ID_e1 in the UE_ID index value field. Furthermore, the paging message comprises the DRX cycle parameter for the eNB as 64.

The paging message is received by the eNB(s) which calculate the paging occurrence to be paging frame 100 and using the paging cycle of 64 as indicated in the paging message.

In more detail, the eNB uses the following formula $$PF\# \bmod T = (T \operatorname{div} \min(T, nB)) * (UE\_ID \bmod \min(T, nB))$$

to calculate the paging frame as follows. The following parameters are assumed for the calculation: T=DRX_cycle=64, nB=1*T, UE_ID=GrMTC_ID=100.

Using these parameters in the formula leads to PF# mod 64=1*36, and thus the paging frame is: 100+r64, where f=0, 1, 2, 3 . . . [100, 164, 228 . . . ].

In accordance therewith, the eNB generates a first paging message including the pseudo S-TMSI (containing the group ID APN) in the corresponding UE paging identity field and broadcasts same at the calculated radio resources of the PDSCH, i.e. paging frame 100. The MTC devices of the eNB group 1 listen to paging frame 100, because of the GrMTC_ID_e1 assigned to them.

The MTC devices perform a similar calculation as the eNB, using the following parameters to calculate the paging frame(s) to monitor: T=DRX_cycle=192, nB=1*T, UE ID=GrMTC_ID=100.

Using theses parameters in the formula leads to PF# mod 192=1*100, and thus the paging frame is: 100+f*92, where f=0, 1, 2, 3 . . . [100, 292 . . . ].

The eNB group 1 MTC devices match the group ID APN against all of their group IDs and since the match is successful, infer that the paging message is addressed to them. Correspondingly, they will wake or adopt the parameter, which is optionally encoded in the pseudo S-TMST together with the group ID APN.

Figure 16:
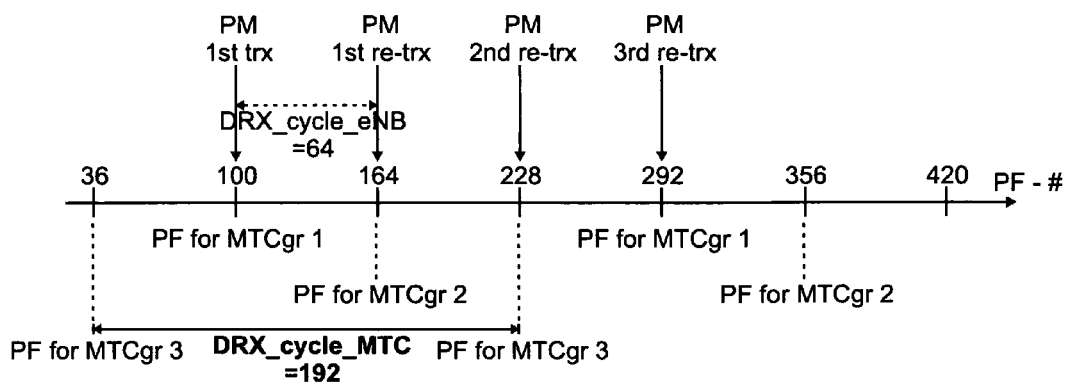

FIG. 16 illustrates the timing of the transmissions and re-transmissions for the paging message done by the eNB, and also illustrates the paging occurrences (in this case only the paging frame, PF, for illustration purposes) for each of the three server groups 1, 2 and 3. The eNB will re-transmit the paging message at the next possible paging occurrence, which is at paging frame 164, i.e. 64 paging frames (the DRX cycle) after the paging frame of the actual paging message (see calculation above for eNB).

The MTC devices of eNB group 2 listen to paging frame 164, because the GrMTC_ID_e2 is purposefully set to 164 (calculation is similar to the one shown for group 1), i.e. matching the timing used by the eNB for the first re-transmission of the paging message. Correspondingly, the eNB group 2 devices read the paging message, ascertain that it is addressed to them (based on the group ID APN) and will thus either wake up or adopt any parameter(s) encoded in the pseudo S-TMSI.

A further second re-transmission of the paging message is effected by the eNB after another 64 paging frames, i.e. at paging frame 228, which coincides with the paging occurrence monitored by the MTC devices of eNB group 3 (GrMTC_ID_e3=228). These MTC devices of eNB group 3 identify the group ID APN as their own, and thus will wake up or adopt any parameter(s) in the pseudo S-TMSI.

As apparent from the above embodiment, instead of using the re-transmissions of a paging message for making sure that the paging message is received correctly by the MTC devices of a first group, the re-transmissions are aligned with the paging occurrences of MTC devices of other groups. In addition, if a higher criterion group ID is included in the paging message which addresses all groups at the same time, it is possible to save resources by only transmitting one paging message from the MME and basically only one from the eNB with the corresponding re-transmissions.

In order to achieve this, the DRX cycle used by the eNB is shorter than the DRX cycle used by the MTC devices. More specifically, assuming the MME wants to address multiple MTC groups and one paging message is re-transmitted two times over the Uu interface, then up to three MTC groups can be paged. To said end, the distance between the paging occurrence, i.e. paging frame and paging occasion, of the three MTC groups is exactly the DRX cycle configured for the eNB. In other words, the three different MTC groups shall have consecutive GrMTC_IDs whose distance is exactly the DRX cycle indicated to the eNB in the paging message from the MME. The DRX cycle in the paging message from the MME to the eNB is equal to the DRX cycle assigned to the MTC devices divided by the number of transmissions of the paging message (denoted tx-total) over the Uu interface, i.e. DRX_cycle_eNB=DRX_cycle_MTC/tx-total.

One advantage provided by the embodiment of the invention as explained with reference to FIGS. 15 and 16 is that a small number of MTC groups (the number corresponds with the number of transmissions of one paging message by the eNB) can be aggregated to form a higher level group. In the illustrative example of FIGS. 15 and 16, the three eNB groups are aggregated to the group for the APN. Then, by using the group ID of the higher level group the paging occurrences however as calculated for the lower level groups, resources may be saved.

Figure 17:
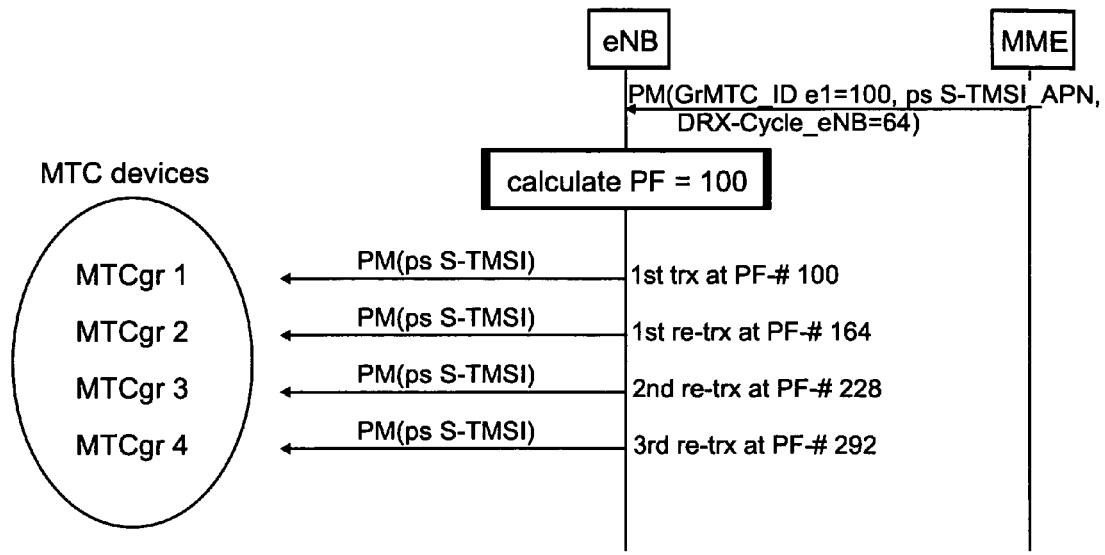
FIGS. 17 and 18 illustrate an embodiment of the invention similar to the one of FIGS. 15 and 16, however considering four MTC groups which are paged using the initial and three re-transmissions of the paging message by the eNB.
Figure 18:
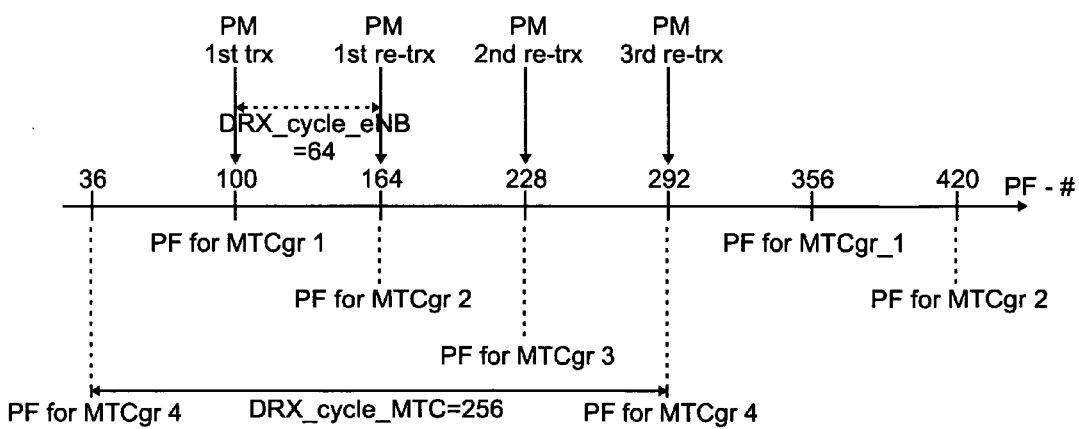

FIGS. 17 and 18 illustrate a similar embodiment of the invention as explained with regard to FIGS. 15 and 16, however differs in that four different groups are paged using only one message transmitted from the MME. Again, the DRX cycle for the eNB is indicated as 64, however since four groups are to be paged (instead of three), the DRX cycle for the MTC devices is 256=4×64 (or 2500 subframes). The paging frames for the first transmission and the three re-transmissions of the paging message are 100, 164, 228 and 292, as illustrated in FIG. 18, which coincide with the paging occurrences for the four groups.

Figure 19:
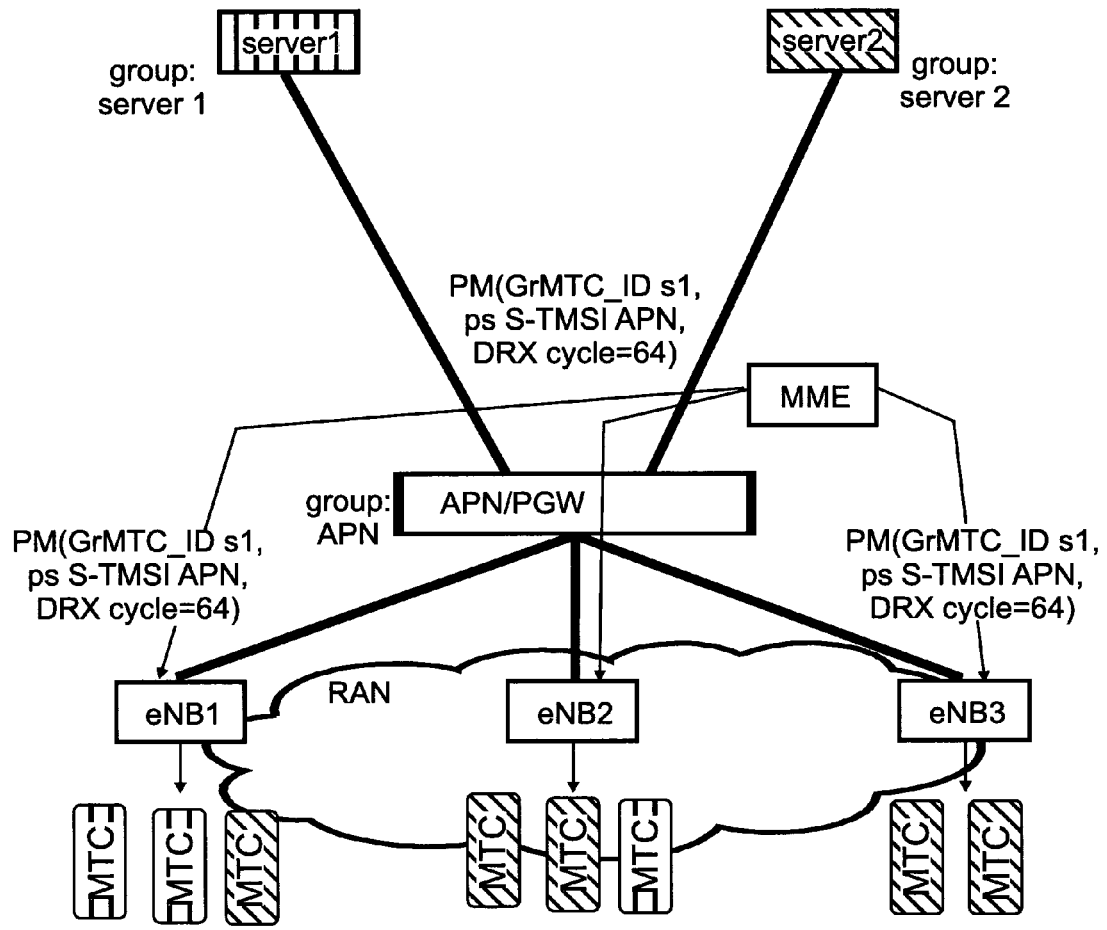
FIG. 19 shows a network deployment for various MTC devices connected to different eNBs and belonging to different server groups, wherein the MME transmits paging messages to all eNBs to page all MTC devices belonging to the same APN according to one embodiment of the invention.

FIG. 19 illustrates various MTC devices connected to various eNBs, which in turn are connected to a single APN/PDN-GW. It is assumed that the MTC devices respectively receive/send data from/to server 1 and server 2. As apparent from FIG. 19 two MTC devices connected to eNB1 and one MTC device connected to eNB2 exchange data with server 1. The remaining MTC devices receive data from server 2. Three groups are formed, one respectively for each server, and one group for the APN, i.e. comprising all MTC devices connected to the APN/PGW.

The MTC devices belonging to server group 1 are assigned with the GrMTC_ID_s1, whereas the MTC devices belonging to server group 2 are assigned with the GrMTC_ID s2 to calculate the paging occurrence being monitored for paging messages. Similar to the embodiments explained with regard to FIGS. 15 to 18, GrMTC_ID s1 and GrMTC_ID s2 are determined such that a re-transmission of the paging message for GrMTC_ID s1 will be received by the MTC devices at the paging occurrence calculated based on GrMTC_ID s2. In particular, it is assumed that GrMTC_ID s1 is 100, and that GrMTC_ID s2 is 164. The DRX cycle of the MTC devices may be 128 paging frames, whereas the paging cycle used by the eNBs should be 64 to be aligned with the difference between GrMTC_ID s1 and GrMTC_ID s2.

It is assumed that the MTC devices belonging to the group of APN/PGW (i.e. of both server groups) are to be paged. In said respect, the MME generates and transmits a paging message comprising the GrMTC_ID_s1=100 in the UE_ID index value field and the group ID for the APN in the UE paging identity field. The paging message further indicates to the eNBs that the DRX cycle that is to be used should be 64.

Respectively one message is transmitted by the MME to each eNB. The eNBs calculate the channel resources based on GrMTC_ID s1 and then transmit a paging message at the calculated resources, i.e. at paging frame 100. The MTC devices belonging to server group 1, having assigned the GrMTC_ID s1, monitor the appropriate channel resources and receive the paging message. Since the group ID APN coincides with the one of the assigned group IDs, these MTC devices wake up.

The eNBs re-transmit the same paging message after the paging cycle at channel resources which coincide with the channel resources calculated based on GrMTC_ID s2. Thus, the re-transmitted paging message is received by the MTC devices belonging to server group 2, and wake up, since the paging message is addressed to the group ID APN.

In another embodiment of the invention the different MTC groups are clustered together. For instance, in case there are 11 MTC groups belonging to APN_1, then the MTC groups can be grouped in three clusters; the first cluster for MTC groups 1-4, the second cluster for MTC groups 5-8 and third cluster comprising MTC groups 9-11. The configuration of the paging occurrences for the clusters can be done as already done as explained with regard to FIGS. 17 and 18. The MTC groups of the first cluster are respectively assigned the GrMTC_IDs 100, 164, 228 and 292. Then, the MTC groups of the second cluster can be assigned the GrMTC_IDs 102, 166, 230 and 294, and the MTC groups of the third cluster can be assigned the GrMTC_IDs 104, 168 and 232.

In said case, the MME must send three paging messages to the eNBs, one paging message per cluster. For example, the paging message for the first cluster includes the group ID for the first cluster and the GrMTC_ID of the first MTC group in said first cluster, i.e. GrMTC_ID 100.

In the previous embodiments of the invention it is proposed that the GrMTC_ID is calculated by the network (e.g. MME) for each MTC group and it is assigned to the MTC devices during the attach procedure. The GrMTC_ID can be semi-static, i.e. it is calculated once and not changed for a long period of time, e.g. for days, weeks or months. Alternatively, the GrMTC_ID may also be dynamic and be changed more frequently. In said cases, the GrMTC_ID may be additionally updated during the TAU procedure.

Advantageously, the GrMTC_ID of the MTC devices should have values that are not used as UE_ID of usual UEs. However, this is not likely to happen because the UE IDs very probably occupy all 1024 possible values. Anyway, if it is possible, the GrMTC_ID of the MTC devices should be chosen in areas where less UE IDs of usual UEs are located.

In order to achieve better coordination between the group paging approach described in the various embodiments of the present invention and the access baring approach (ACB), the network may apply the group paging of the present invention after the network detects that access restriction for the MTC devices is needed. Afterwards, the network may start updating the broadcasted system information (SIB), i.e. to apply the ACB approach.

When the MTC devices detect the network access restriction broadcast in the SIB, the MTC devices may apply the restriction parameters indicated in the SIB, instead of the parameters indicated through the group paging approach. With other words it is proposed that the ACB approach has a higher priority than the group paging mechanism of the invention. Alternatively, the group paging approach may have higher priority, or the network can dynamically configure the priority of the approaches.

Detached MTC devices, also called non-attached, are MTC devices with radio interfaces that may be switched on, however, they are just listering to the broadcast signals without initiating an RRC connection establishment. Such detached MTC devices are normally not known by the network because they are not registered. These non-attached MTC devices can cause a significant signalling overload due to a simultaneous attach procedure initiated at once by thousand or millions of devices. Therefore, it would be also important to limit or prevent the signalling of non-attached MTC devices is a similar way to MTC devices in IDLE or CONNECTED mode.

This may be done by the Access Class Baring approach of the prior art. The MTC devices should read the SIB2 information before starting with the attach procedure. If the non-attached MTC devices are bared, then they are allowed to access the network according to the parameters of the baring factor and the baring time. However, since the ACB approach is a slow solution, a further embodiment of the invention is presented in the following to apply the group based paging approach to non-attached MTC devices.

Usually, the non-attached MTC devices are configured not to listen to the paging frames and subframes. Correspondingly, the MME usually does not send paging messages to non-attached UEs and MTC devices. According to an embodiment of the invention, the non-attached MTC devices should be allowed to monitor the paging occurrences (paging frame and paging subframe), and the network, in particular the MME, should be able to page non-attached MTC devices.

To said end, the non-attached MTC devices should be aware about the assigned group IDs and the GrMTC_IDs. The MTC devices may store the GrMTC_ID and group IDs assigned during the last performed attach procedure. This information can be stored in a non-volatile memory in the MTC devices so that it is kept if the MTC device is switched off. Correspondingly, the network, e.g. the MME, should store this information although the MTC devices are not attached.

The MME and the MTC devices can exchange information on their capabilities to store this information during the attach procedure. For instance, the MTC device can include in the Initial Attach NAS message an indication to the MME that it is capable of storing the GrMTC_ID and the group IDs in non-volatile memory. Furthermore, the MTC device might include information about its capability to monitor the corresponding paging occurrence while detached and not registered. The MME then infers that it shall not delete the context of the MTC device after the MTC device detaches from the network, but shall keep it stored instead, and shall page the non-attached MTC devices if necessary.

In case the MTC devices cannot store the GrMTC_ID in non-volatile memory, it is alternatively possible to specify a pre-defined group paging occurrence for all MTC devices that are not capable of storing the GrMTC_ID. The MTC devices are pre-configured with the information about the pre-defined group paging occurrence and should monitor the paging occurrence accordingly. In order to calculate the pre-defined group paging occurrence, the MTC devices use the pre-defined GrMTC_ID, and the other parameters, T and nB, needed in said respect are taken fro the SIB information which is broadcast in the radio network. The MME knows the SIB information which is broadcast and thus can generate and transmit a corresponding paging message to the eNB(s). The group IDs should be pre-configured in the non-volatile memory or stored therein during the last attach procedure, so that the MTC devices can derive the corresponding action when they detect paging in the pre-defined paging occurrence.

The ideas presented for the previous embodiments relating to IDLE MTC devices also apply to the detached MTC devices. For instance, the detached MTC devices may also listen to the pre-configured paging occurrence and/or the paging occurrence based on its own IMSI (IMSI mod 1024). Furthermore, if the network would like to page the detached MTC devices to trigger the attach procedure, the network uses the individual IMSI in the UE paging identity field of the paging message. If the network would like to page the MTC devices to inform them about network access restriction parameters (or other parameters), the MME includes the corresponding pseudo IMSI/S-TMSI (including the group ID) in the UE paging identity field of the paging message.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for paging at least a first, a second, and a third group of devices, attached to at least one radio control entity (eNB) in a network, the method comprising the steps of:
assigning a group paging target identity and a group paging resource indication during paging to all devices of the first group of devices;
transmitting from an entity in the network a first paging message to the at least one radio control entity, the first paging message comprising the group paging target identity and the group paging resource indication,
based on the received group paging resource indication, calculating by the at least one radio control entity transmission resources on a radio channel for transmitting a second paging message to the devices of the first group,
transmitting by the at least one radio control entity the second paging message, said second paging message comprising the group paging target identity at the calculated transmission resources of the radio channel,
receiving by the devices of the first group the second paging message at the calculated transmission resources of the radio channel,
assigning a second group paging target identity to the devices of the first group, second group and third group,
assigning a second group paging resource indication to the devices of the second group used by the devices of the second group to calculate the radio channel resources to receive paging messages, wherein the second group paging resource indication is determined such that a re-transmission of the second paging message transmitted for the first group of devices is received by the devices of the second group,
assigning a third group paging resource indication to the devices of the third group used by the devices of the third group to calculate the radio channel resources to receive paging messages, wherein the third group paging resource indication is determined such that a second re-transmission of the second paging message transmitted for the first group of devices is received by the devices of the third group,
wherein the third group paging resource indication differs from the second group paging resource indication by the same amount as the second group paging resource indication differs from the group paging resource indication,
wherein the radio control entity performs re-transmissions of the second paging message based on a cycle parameter, and wherein the devices of the first, second and third group use a second cycle parameter for calculating the radio channel resources to receive paging messages, wherein the second cycle parameter is three times the amount of the cycle parameter used by the radio control entity.

2. The method according to claim 1, wherein the group paging target identity is part of a group international mobile subscription identity for the devices of the first group, and the group international mobile subscription identity further comprises parameters specific to the devices of the first group, wherein the parameters indicate an access restriction to the network for the devices of the first group.

3. The method according to claim 2, wherein the parameters in the group international mobile subscription identity indicates a time for which the devices of the first group shall postpone the connection to the network after having received a paging message instructing the devices of the first group to connect to the network.

4. The method according to claim 3 further comprising the steps of:
    deciding by the devices of the first group whether the second paging message is destined to the first group of devices based on the group identity comprised within the group paging target identity, and
    deciding by the devices of the first group whether to adopt the parameters comprised within the group paging target identity or to transit from an idle state into a connected state, based on the parameters comprised within the group international mobile subscription identity.

5. The method according to claim 1, wherein a different international mobile subscriber identity is assigned to each device, the method further comprising the steps of:
    calculating by each device of the first group radio channel resources for receiving paging messages based on the group paging resource indication of the first group and/or based on the international mobile subscriber identity.

6. The method according to claim 1, wherein a device belongs to at least two different groups of devices being identified by two different group paging target identities, and wherein the device is assigned one of the two different group paging target identities.

7. The method according to claim 1, wherein the cycle parameter corresponds to the difference between the group paging resource indication of the first group of devices and the second group paging resource indication of the second group of devices.

8. The method according to claim 1, wherein the second cycle parameter is double the amount of the cycle parameter used by the radio control entity.

9. A paging entity in a network for paging a first group of devices, attached to at least one radio control entity in the network, the paging entity comprising:
    a mobility management entity adapted to generate and assign a group paging target identity and a group paging resource indication to all devices of the first group during paging,
    a transmitter adapted to transmit a first paging message to the at least one radio control entity, the first paging message comprising the group paging target identity and the group paging resource indication,
    wherein the group paging resource indication is used by the radio control entity to calculate transmission resources on a radio channel to transmit a second paging message on the radio channel to be received by the devices of the first group, wherein:
    the mobility management entity is further adapted to assign a second group paging target identity to devices of the first group, second group and third group,
    the mobility management entity is further adapted to assign a second group paging resource indication to the devices of the second group, the second group paging resource indication being used by the devices of the second group to calculate the radio channel resources to receive paging messages,
    a processor adapted to determine the second group paging resource indication such that a re-transmission of the second paging message transmitted for the devices of the first group is received by the devices of the second group,
    the mobility management entity is further adapted to assign a third group paging resource indication to devices of the third group, the third group paging resource indication used by the devices of the third group to calculate the radio channel resources to receive paging messages,
    the processor is further adapted to determine the third group paging resource indication such that a second re-transmission of the second paging message transmitted for the first group of devices is received by the devices of the third group,
    the third group paging resource indication differs from the second group paging resource indication by the same amount as the second group paging resource indication differs from the group paging resource indication.

* * * * *